(12) United States Patent
Li et al.

(10) Patent No.: US 11,636,371 B2
(45) Date of Patent: Apr. 25, 2023

(54) COMPUTATIONAL PLATFORM FOR QUANTUM STRUCTURES

(71) Applicant: WISYS TECHNOLOGY FOUNDATION, INC., Madison, WI (US)

(72) Inventors: Wei Li, Platteville, WI (US); Samuel William Belling, Fitchburg, WI (US); Heather Lynn Cihak, Platteville, WI (US)

(73) Assignee: WISYS TECHNOLOGY FOUNDATION, INC., Madison, WI (US)

( * ) Notice: Subject to any disclaimer, the term of this patent is extended or adjusted under 35 U.S.C. 154(b) by 501 days.

(21) Appl. No.: 16/660,472

(22) Filed: Oct. 22, 2019

(65) Prior Publication Data

US 2020/0125986 A1    Apr. 23, 2020

Related U.S. Application Data

(60) Provisional application No. 62/748,986, filed on Oct. 22, 2018.

(51) Int. Cl.
  *G06N 10/00* (2022.01)
  *G06F 30/23* (2020.01)
  *G06F 119/18* (2020.01)

(52) U.S. Cl.
  CPC .............. *G06N 10/00* (2019.01); *G06F 30/23* (2020.01); *G06F 2119/18* (2020.01)

(58) Field of Classification Search
  CPC ..... G06N 10/00; G06F 30/23; G06F 2119/18; G06F 2111/10; G06F 30/20
  See application file for complete search history.

(56) References Cited

U.S. PATENT DOCUMENTS

2018/0336302 A1* 11/2018 Klimeck ................. G06F 30/20
2019/0157393 A1*  5/2019 Roberts ................. H01L 29/423
(Continued)

OTHER PUBLICATIONS

Ahmed S, et al. (2010) Electronic structure of InN/GaN quantum dots: multimillion-atom tight-binding simulations. IEEE Trans Elect Dev 57:164-173.
(Continued)

*Primary Examiner* — Stacy Whitmore
(74) *Attorney, Agent, or Firm* — Quarles & Brady LLP

(57) ABSTRACT

The present disclosure provides a computational platform for quantum structures. The computational platform includes an input module configured to receive parameter information corresponding to a quantum structure, and a processor programmed to carry out instructions stored in a computer-readable medium. The instructions include receiving, using the input module, the parameter information corresponding to the quantum structures, and generating a quantum structure model based on the parameter information received. The instructions also include determining at least one property of the quantum structure, and generating a report indicative of the at least one property determined. The computational platform also includes an output module for providing the report.

16 Claims, 18 Drawing Sheets
(16 of 18 Drawing Sheet(s) Filed in Color)

(56) References Cited

U.S. PATENT DOCUMENTS

| | | | |
|---|---|---|---|
| 2021/0398018 A1* | 12/2021 | Dao | G06N 20/00 |
| 2022/0019931 A1* | 1/2022 | Jiang | G06F 17/16 |

OTHER PUBLICATIONS

Baskoutas S et al. 2006 Size-dependent band gap of colloidal quantum dots J. Appl. Phys. 99 013708.

Belling SW, et al (2018) Finite element analysis of strain effects on symmetry reduction of semiconductor quantum dots. Superlattice Microst 120:22-30.

Bester G et al. 2005 Cylindrically shaped zinc-blende semiconductor quantum dots do not have cylindrical symmetry: atomistic symmetry, atomic relaxation, and piezoelectric effects Phys. Rev. B 71 045318.

Bester G, et al. (2006) Effects of linear and nonlinear piezoelectricity on the electronic properties of InAs/GaAs quantum dots. Phys Rev B74:081305.

Beya-Wakata, A. et al, First and second-order piezoelectricity in III-V semiconductors, Phys. Rev. B 84 (2011) 195207.

Cheche, To et al, Analytical approach for strain and piezoelectric potential in conical self-assembled quantum dots, J. Appl. Phys. 104 (2008) 083524.

Cusack M A, et al. 1996 Electronic structure of InAs/GaAs self-assembled quantum dots Phys.Rev. B 54 R2300.

Faux, D.A. et al, "Analytic solutions for strain distributions in quantum-wire structures," J. Appl. Phys. vol. 82, 1997, p. 3754.

Foreman BA (1997) Elimination of spurious solutions from eight band k.p theory. Phys Rev B 56:R12748.

Ilatikhameneh, H. et al, Universal behavior of atomistic strain in self-assembled quantum dots, IEEE J. Quant. Electron. 52 (2016) 1-8.

Johnson, H. T., et al. "Finite element analysis of strain effects on electronic and transport properties in quantum dots and wires." Journal of applied physics 84.7 (1998): 3714-3725.

Klimeck G et al 2007 Atomistic simulation of realistically sized nanodevices using NEMO 3D—part I: models and benchmarks IEEE Trans. Electron Devices 54 2079-89.

Kulkova, S.E. et al, "Atomic and electronic structures of GaAs (001) surface," Russ. Phys. J., vol. 49, issue 10, Oct. 2006, pp. 1088-1096.

Li W. et al, "Reinvestigation of quantum dot symmetry: the symmetric group of the 8-band k-p theory Hamiltonian," J. Nanopart. Res. vol. 21, 2019, pp. 16.

Li W. et al, Symmetric analysis, categorization, and optical spectrum of ideal pyramid quantum dots, J. Phys. D Appl. Phys. 50 (2017) 435102.

Liu, G. R., et al. "A finite element study of the stress and strain fields of InAs quantum dots embedded in GaAs." Semiconductor science and technology 17.6 (2002): 630.

Maranganti, R. et al. "Strain field calculations in embedded quantum dots and wires." Journal of Computational and Theoretical Nanoscience 4.4 (2007): 715-738.

Pryor C 1998 Eight-band calculations of strained InAs/GaAs quantum dots compared with one-, four-, and six-band approximations Phys. Rev. B 57 7190.

Schliwa A, et al (2007) Impact of size, shape, and composition on piezoelectric effects and electronic properties of In(Ga)As/GaAs quantum dots. Phys Rev B76:205324.

Stier O, et al. 1999 Electronic and optical properties of strained quantum dots modeled by8-band k.p theory Phys. Rev. B 59 5688.

Tomic S (2006) Electronic structure of InyGa1-yAs1-xNx/GaAs(N) quantum dots by ten-band k-p theory. Phys Rev 873:125348.

Tomic, S. et al, Symmetry reduction in multiband Hamiltonians for semiconductor quantum dots: the role of interfaces and higher energy bands, J. Appl. Phys. 110 (2011) 053710.

Tomic, S. et al. (2014) Symmetries in Multiband Hamiltonians for Semiconductor Quantum Dots. Chapter 3 in Multiband effective mass approximations, Ehrhardt M, Koprucki T (eds) (2014), Springer, New York.

Veprek RG, et al (2007) Ellipticity and the spurious solution problem of k-p envelope equations. Phys Rev 876:165320.

Vukmirovic N, et al (2005) Symmetry of k-p Hamiltonian in pyramidal InAs/ nGaAs quantum dots: application to the calculation of electronic structure. Phys Rev B72:075356.

Zhao Q et al. 2011 Analysis of electronic structures of quantum dots using meshless Fourier transform k.p method J. Appl. Phys. 109 063101.

Zhao Q, et al. 2012 Elimination of spurious solutions from k.p theory with Fourier transform technique and Burt-Foreman operator ordering J. Appl. Phys. 111 053702.

Zielke R, et al. 2014 Anisotropic g factorin InAs self-assembled quantum dots Phys. Rev. B89 115438.

* cited by examiner

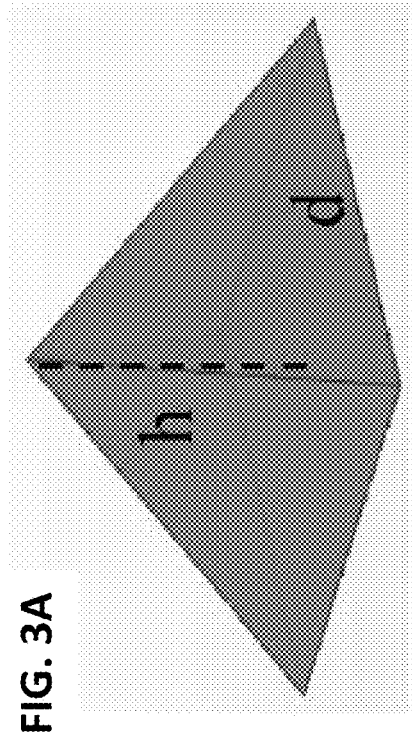
FIG. 3A
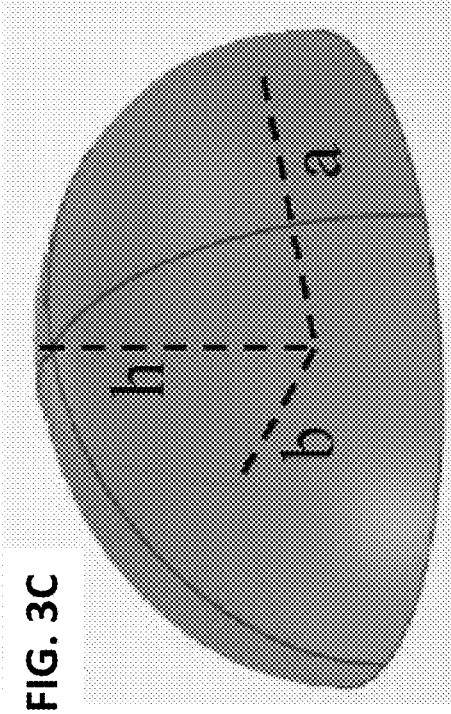
FIG. 3C
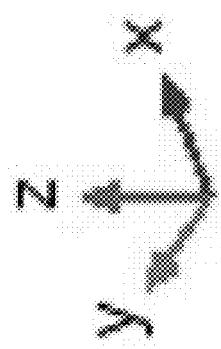
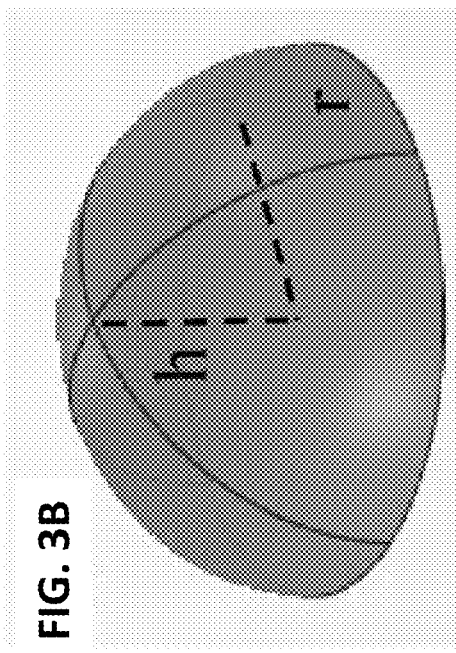
FIG. 3B

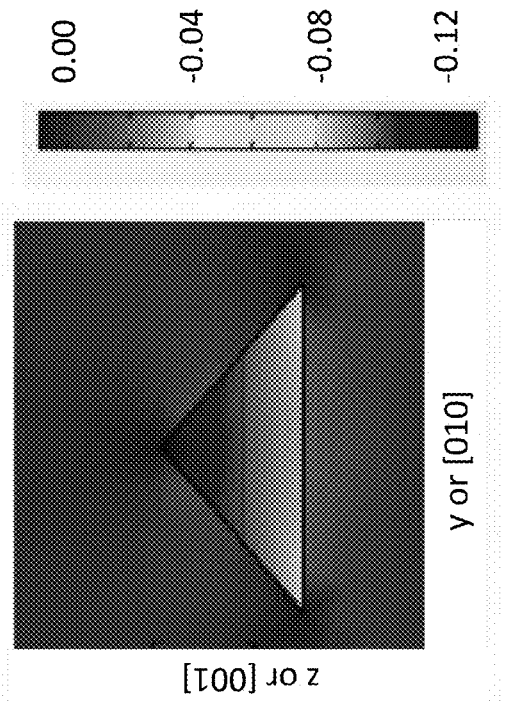
FIG. 4A (xy plane)
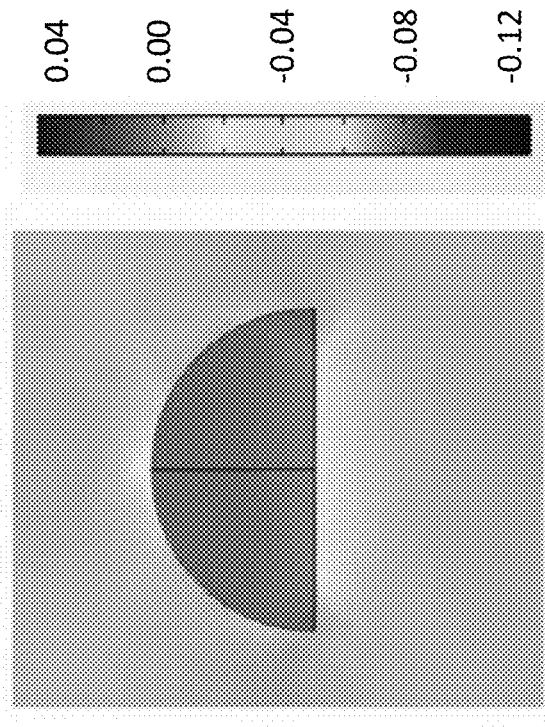
FIG. 4B (yz plane)
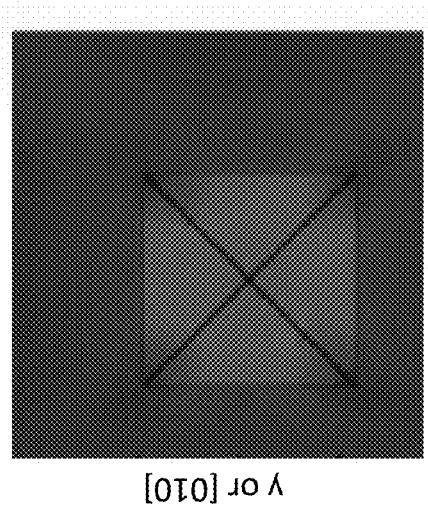
FIG. 4C (xy plane)
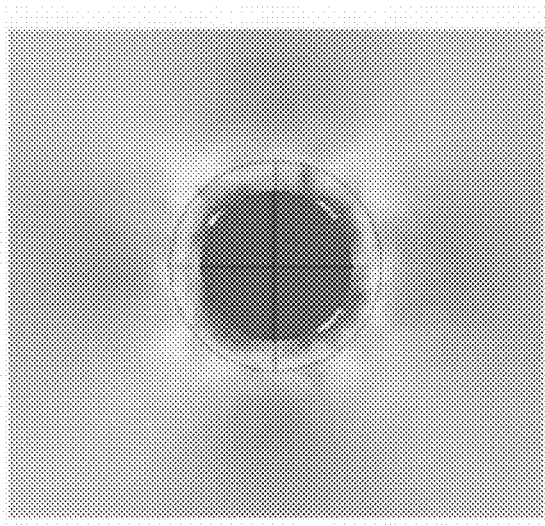
FIG. 4D (yz plane)

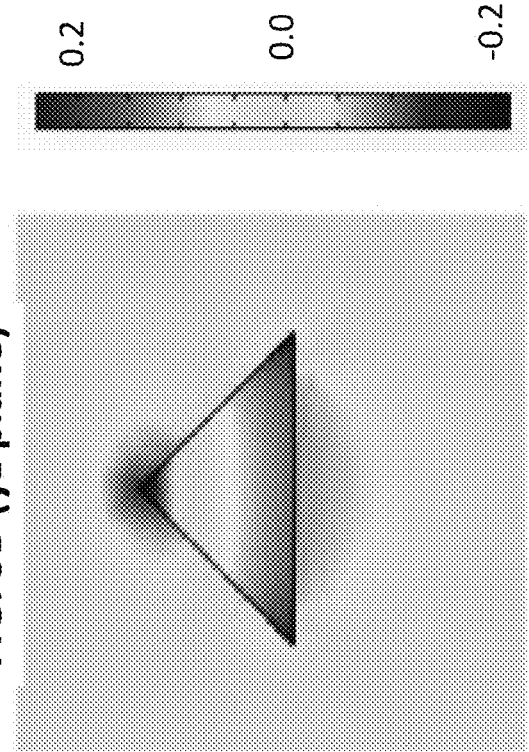
FIG. 5A (xy plane)
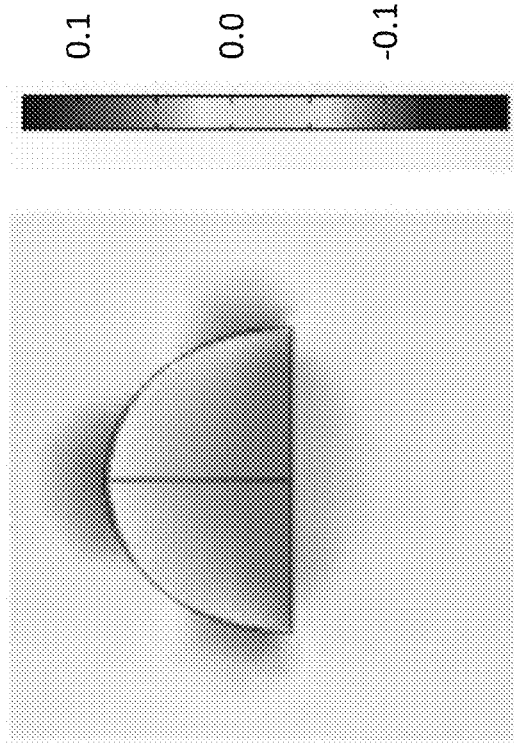
FIG. 5B (yz plane)
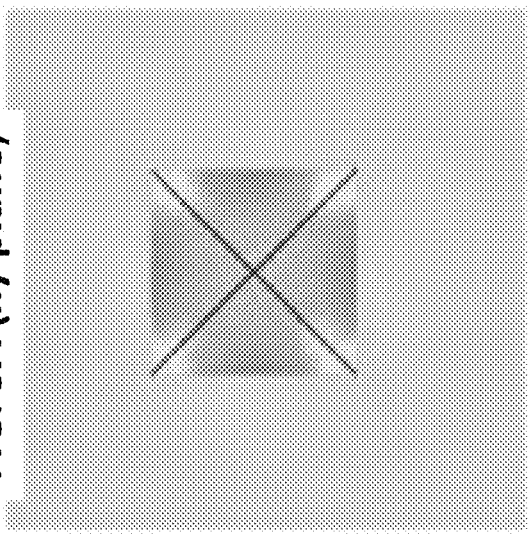
FIG. 5C (xy plane)
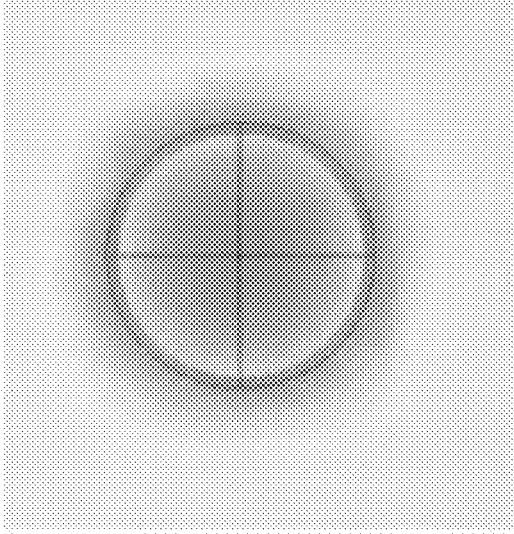
FIG. 5D (yz plane)

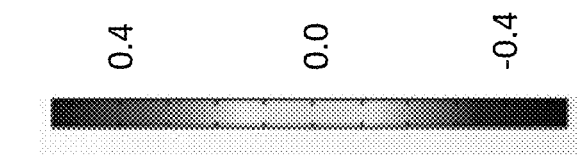
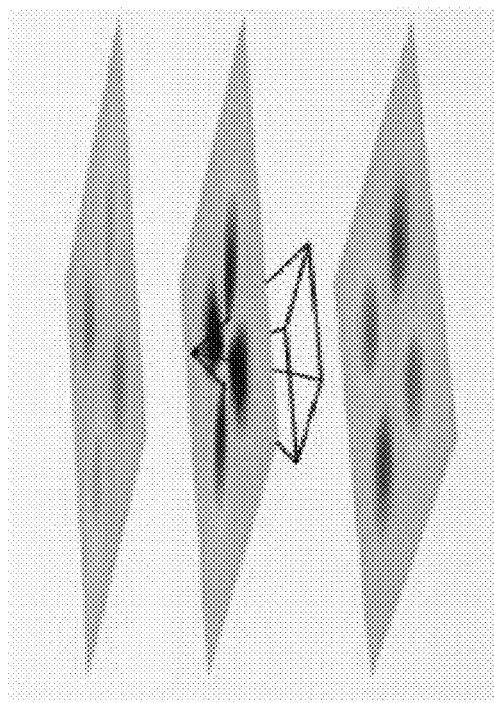
FIG. 7B (xy slices)
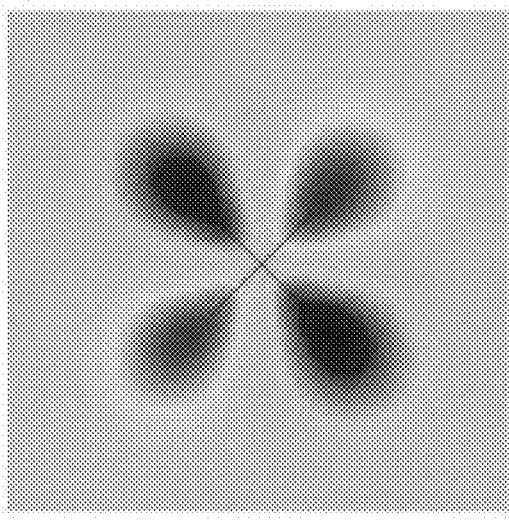
FIG. 7A (xy plane)
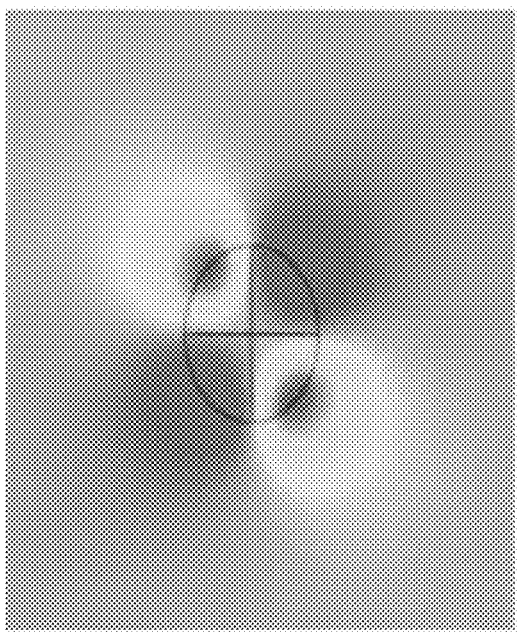
FIG. 7D (xy plane)
FIG. 7C (xy plane)

d (nm), R=h/d from 1 to 0.42

FIG. 10A
$\varepsilon_{xz}$- xy plane
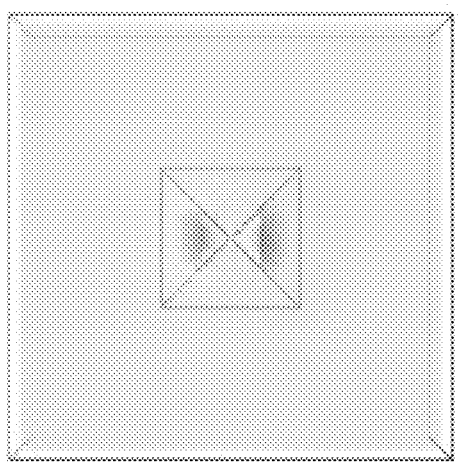
FIG. 10B
$\varepsilon_{yz}$- xy plane
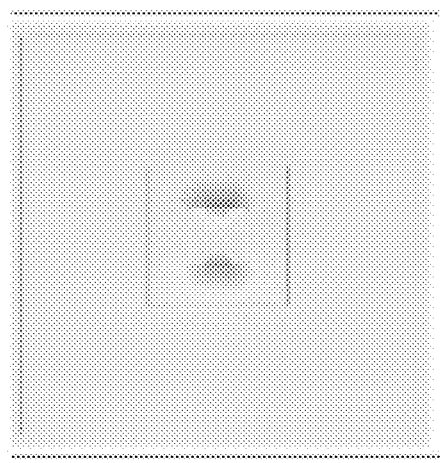
FIG. 10C
$\varepsilon_{xy}$- xy plane
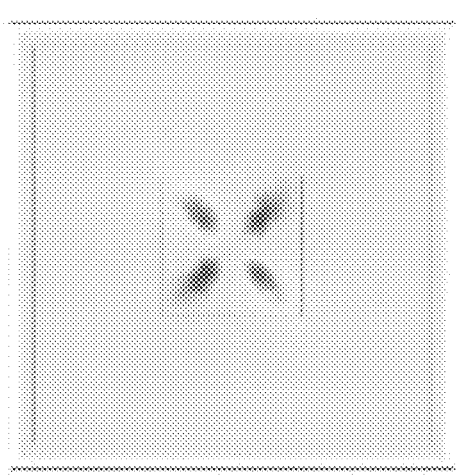
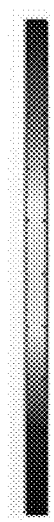
$2.0 \times 10^{-2}$
$0.0$
$-2.0 \times 10^{-2}$

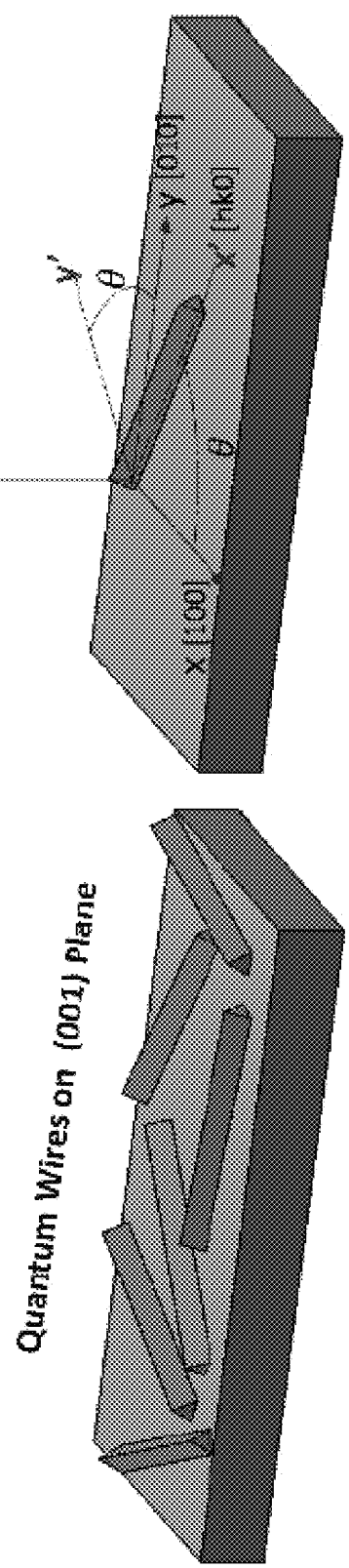

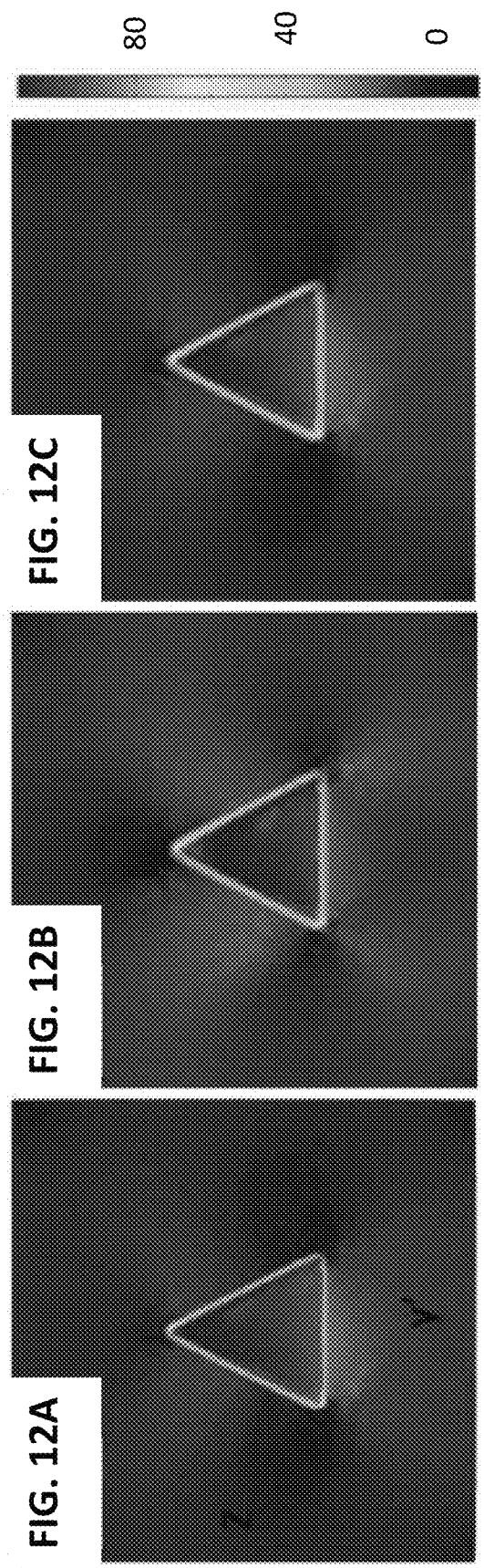

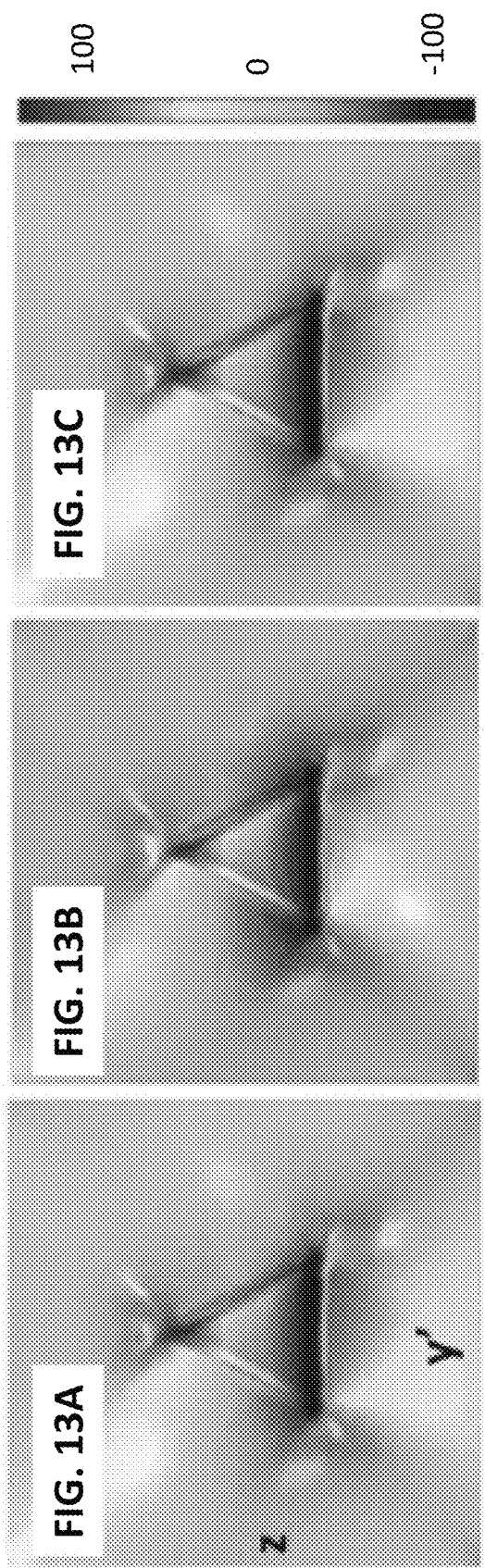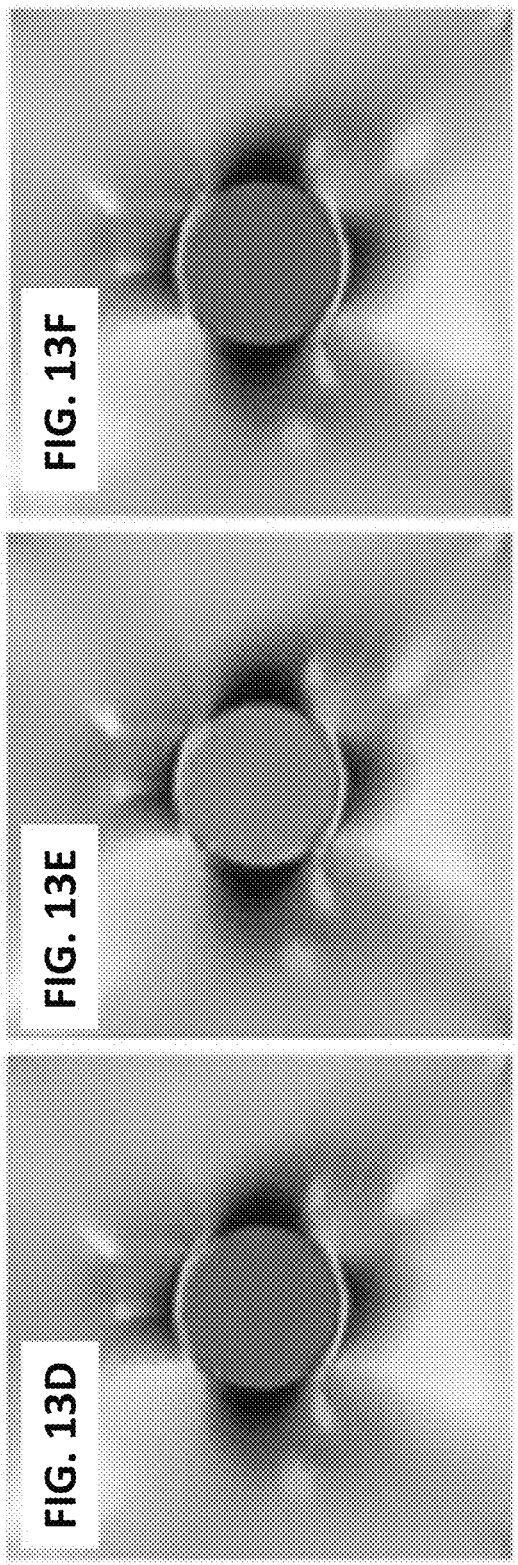

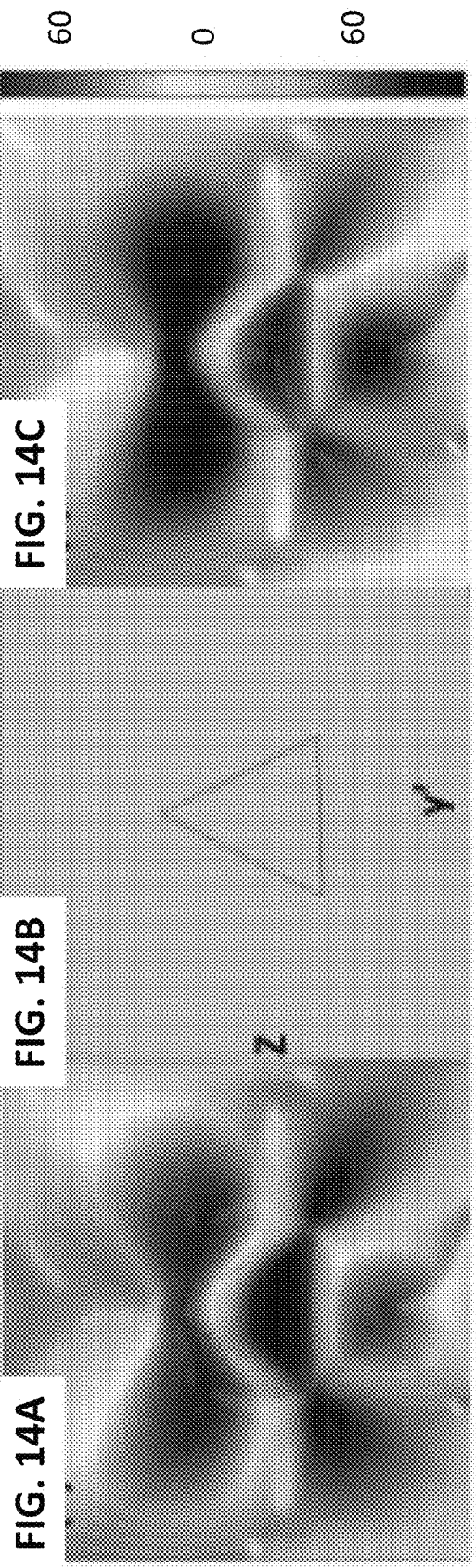
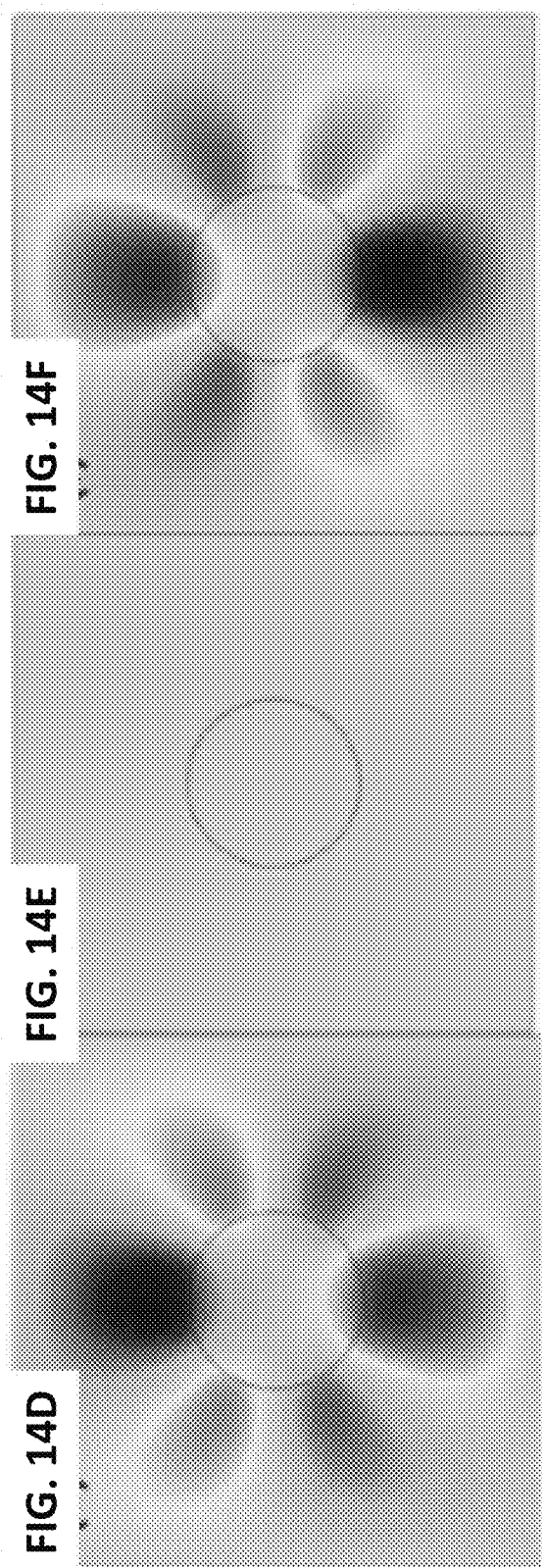
FIG. 14A  FIG. 14B  FIG. 14C
FIG. 14D  FIG. 14E  FIG. 14F

COMPUTATIONAL PLATFORM FOR QUANTUM STRUCTURES

CROSS REFERENCE TO RELATED APPLICATIONS

This application claims benefit of priority to U.S. Provisional Application No. 62/748,986, filed Oct. 22, 2018, the contents of which is incorporated by reference in its entirety.

BACKGROUND

The present disclosure generally relates to quantum structures, such as quantum dots and quantum wires. More specifically, the present disclosure is directed to systems and methods for quantum structure modeling, design, simulation, and manufacture.

Quantum structures, such as self-assembled quantum dots (QDs) have found an increasing range of applications in commercial and research settings, including optoelectronics, medical imaging, quantum computing, and so forth. For example, QDs have been used in light emitting diodes (LED), laser diodes, photodetectors, solar cells, displays, sensors, quantum bits (i.e. qubits), and so on. Due to crystal symmetry, self-assembled QDs tend to form highly symmetric shapes with the dot facet in a specific crystal plane, such as pyramids. With certain doping techniques, other symmetric shapes can also be produced, such as lenses and half-ellipsoids.

A quantum structures experiences strain effects that originate from the lattice mismatch between the quantum structure and a contacted matrix. Several approaches have been introduced to investigate strain-related effects on quantum structures, including atomistic models and analytical models. Atomistic models may provide accurate results, but they demand expensive computational resources and require a large number of difficult to obtain atomic input parameters.

Analytical models, on the other hand, are easier to implement and more computationally efficient. However, analytical approaches are limited in their range of application and accuracy. For example, it is almost impossible to address complicated geometric shapes and anisotropic effects analytically. Recently, it has been reported that analytical models can be calibrated based on accurate atomistic simulation results. However, such calibrated analytical models can only predict strain effects at the center of a QD, and not the entire strain profile in the QD and matrix.

Strain, stress, material displacement, and other factors, play important roles in the formation and ultimate properties of QDs (e.g., carrier confinement, optical properties). Therefore, there is a need for improved approaches that can efficiently and accurately characterize quantum structures to enable rational quantum structure design and fabrication.

SUMMARY

The present disclosure provides a computational platform for the characterization, rational design, and fabrication for quantum structures. The presently disclosed platform overcomes the shortcomings of previous methods, providing improved accuracy and computational efficiency. Features and advantages of the present invention will become apparent from the following description.

In one aspect of the present disclosure, a computer-readable medium embedded with instructions executable by a processor of a computational platform is provided. The instructions include steps of receiving, using an input of a computational platform, parameter information corresponding to a quantum structure, and generating, using a processor of the computational platform, a quantum structure model based on the parameter information received. The instructions include steps of determining, using the processor, at least one property of the quantum structure, and generating a report indicative of the at least one property determined.

In another aspect of the present disclosure, a computational platform for a quantum structure is provided. The computational platform includes an input module configured to receive parameter information corresponding to a quantum structure, and a processor programmed to carry out instructions stored in a computer-readable medium. The instructions include receiving, using the input module, the parameter information corresponding to the quantum structure, and generating a quantum structure model based on the parameter information received. The instructions also include determining at least one property of the quantum structure, and generating a report indicative of the at least one property determined. The computational platform also includes an output module for providing the report.

In another aspect of the present disclosure, a method for the fabrication of quantum structure is provided. The method includes receiving, using an input of a computational platform, parameter information corresponding to a quantum structure and generating, using a Strain solver module, at least one mesh based on the parameter information received, obtaining, using the strain solver module, a displacement vector u and a strain tensor $\bar{\varepsilon}$. The method also includes obtaining, using a piezo-electric solver module a piezoelectric energy change $\delta E_{Piezo}$. The method also includes obtaining, using a Schrödinger solver module and a second mesh, a Hamiltonian $\hat{H}$, a strain induced potential $V_{Strain}$, a strain induced deformation potential $V_{Deform}$, a wavefunction, an eigenstate, an eigen-energy, or any combination thereof and evaluating the symmetry of the object obtained using the Schrödinger solver module. The method also includes generating design information or control signals based on at least one property of the quantum structure and providing the information or control signals to an assembly line using an output module.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will hereafter be described with reference to the accompanying drawings, wherein like reference numerals denote like elements.

FIGS. 3A-3C are graphical illustrations showing exemplary (FIG. 3A) pyramidal; (FIG. 3B) a circular-based lens shape; and (FIG. 3C) ellipsoidal quantum dots (QDs).

FIGS. 4A-4D are graphical illustrations showing exemplary hydrostatic deformations (in eV) of a pyramidal QD in the (FIG. 4A) xy plane and (FIG. 4B) yz plane and a circular-based lens QD in the (FIG. 4C) xy plane, and (FIG. 4D) yz plane. The top color gradient corresponds to FIGS. 4A-4B and the bottom color gradient corresponds to FIGS. 4C-4D.

FIGS. 5A-5D are graphical illustrations showing exemplary biaxial deformations (in eV) of a pyramidal QD in the (FIG. 5A) xy plane and (FIG. 5B) yz plane and a circular-based lens QD in the (FIG. 5C) xy plane and (FIG. 5D) yz plane corresponding to of FIGS. 4A-4D, respectively. The top color gradient corresponds to FIGS. 5A-5B and the bottom color gradient corresponds to FIGS. 5C-5D.

FIGS. 7A-7D are graphical illustrations showing exemplary piezoelectric potential profiles (in eV) for a pyramidal (FIG. 7A) and (FIG. 7B), circular-based lens (FIG. 7C), and half-ellipsoidal (FIG. 7D) QDs. The top color gradient corresponds to FIGS. 7A-7D.

(FIG. 9B) minimum band gap for C-HH and C-LH transitions; and (FIG. 9C) bandgaps at the isocenter of a QD.

FIGS. 10A-10C are graphical illustrations showing exemplary (FIG. 10A) $\varepsilon_{xz}$, (FIG. 10B) $\varepsilon_{yz}$, and (FIG. 10C) $\varepsilon_{xy}$ shear strain profiles for a QD the xy plane. The top color gradient corresponds to FIGS. 10A-10C.

FIGS. 11A-11B are schematic illustrations showing (FIG. 11A) QWRs on a substrate in the (001) plane and (FIG. 11B) a QWR oriented in an arbitrary direction and its associate coordinate transformation.

FIGS. 12A-12C are graphical illustrations showing hydrostatic potential profiles (in meV) on the (y', z) plane for triangle-based QWRs with (FIG. 12A) θ=−45°, (FIG. 12B) θ=0°, and (FIG. 12C) θ=45°. The top color gradient corresponds to FIGS. 12A-12C.

FIGS. 13A-13F are graphical illustrations showing biaxial potential profiles (in meV) on the (y', z) plane for triangle-based QWRs with (FIG. 13A) θ=−45°, (FIG. 13A) θ=0°, and (FIG. 13A) θ=45°; and for the cylindrical QWRs with (FIG. 13A) θ=−45°, (FIG. 13A) θ=0°, and (FIG. 13A) θ=45°. The top color gradient corresponds to FIGS. 13A-13F.

FIGS. 14A-14F are graphical illustrations showing piezoelectric potential energy profiles (in meV) on the (y',z) plane for triangle-based QWRs with (FIG. 14A) θ=−45°, (FIG. 14B) θ=0°, and (FIG. 14C) θ=45°; and for the cylindrical QWRs with (FIG. 14D) θ=−45°, (FIG. 14E) θ=0°, and (FIG. 14F) θ=45°. The top color gradient corresponds to FIGS. 14A-14F.

DETAILED DESCRIPTION

Provided herein is a computation platform for quantum structures, computer-readable medium embedded with instructions executable by a processor of a computational platform, and methods for using the platform for the fabrication of a quantum structure. The presently disclosed technology is capable of providing accurate and efficient methods that enable the rational design and fabrication of quantum structures.

Figure 1:
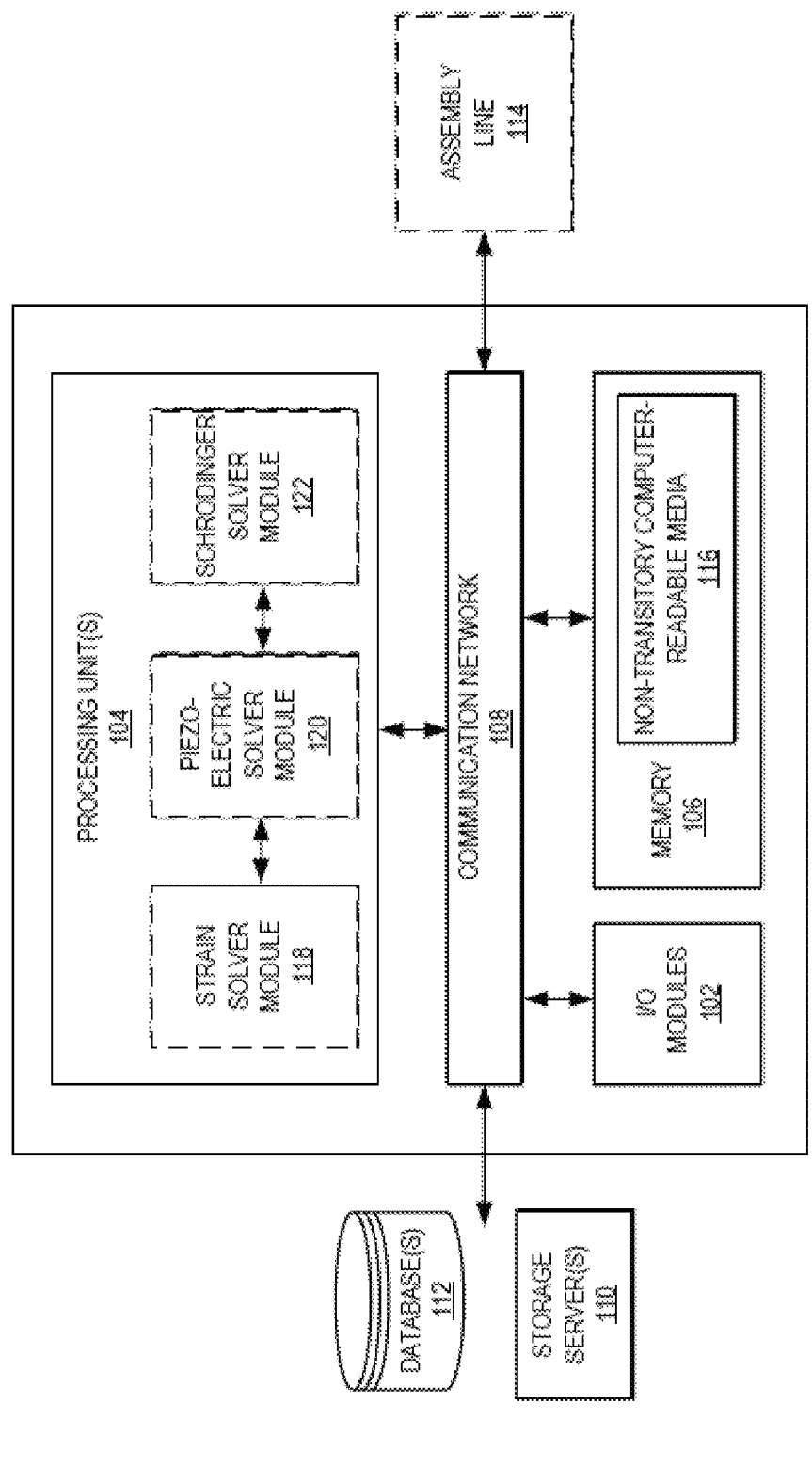
FIG. 1 is a schematic diagram of an example computational platform, in accordance with aspects of the present disclosure.

Referring particularly to FIG. 1, a block diagram of a computational platform 100, in accordance with aspects of the present disclosure, is shown. Suitably, computational platform 100 is capable of characterizing, predicting properties, rationally designing, or fabricating a quantum structure. Quantum structures include conducting and semiconducting materials possessing quantized behavior. Suitably, quantum materials include quantum dots (QDs), quantum wires (QWRs), and quantum wells. As shown, the computational platform 100 may generally include various input/output (I/O) modules 102, one or more processing units 104, a memory 106, and a communication network 108.

In some implementations, the computational platform 100 may be any general-purpose computing system or device, such as a personal computer, workstation, cellular phone, smartphone, laptop, tablet, or the like. In this regard, the computational platform 100 may be a system designed to integrate a variety of software, hardware, capabilities, and functionalities. Alternatively, and by way of particular configurations and programming, the computational platform 100 may be a special-purpose system or device.

The computational platform 100 may operate autonomously or semi-autonomously based on user input, feedback, or instructions. In some implementations, the computational platform 100 may operate as part of, or in collaboration with, various computers, systems, devices, machines, mainframes, networks, and servers. For instance, as shown in FIG. 1, the computational platform 100 may communicate with one or more server 110 or database 112, by way of a wired or wireless connection. Optionally, the computational platform 100 may also communicate with various devices, hardware, and computers of an assembly line 114. For instance, the assembly line 114 may include various fabrication, processing, or process control systems, such as deposition systems, reactors, lasers, electrochemical systems, and so forth.

The I/O modules 102 of the computational platform 100 may include various input elements, such as a mouse, keyboard, touchpad, touchscreen, buttons, microphone, and the like, for receiving various selections and operational instructions from a user. The I/O modules 102 may also include various drives and receptacles, such as flash-drives, USB drives, CD/DVD drives, and other computer-readable medium receptacles, for receiving various data and information. To this end, I/O modules 102 may also include a number of communication ports and modules capable of providing communication via Ethernet, Bluetooth, or WiFi, to exchange data and information with various external computers, systems, devices, machines, mainframes, servers, networks, and the like. In addition, the I/O modules 102 may also include various output elements, such as displays, screens, speakers, LCDs, and others.

The processing unit(s) 104 may include any suitable hardware and components designed or capable of carrying out a variety of processing tasks, including steps implementing the present framework for quantum structure simulation. To do so, the processing unit(s) 104 may access or receive a variety of information, including parameter information corresponding to a quantum structure or quantum structure array/assembly, and generate a quantum structure model, as will be described. The parameter information may be stored or tabulated in the memory 106, in the storage server(s), in the database(s) 112, or elsewhere. In addition, such information may be provided by a user via the I/O modules 102, or selected based on user input.

In some configurations, the processing unit(s) 104 may include a programmable processor or combination of programmable processors, such as central processing units (CPUs), graphics processing units (GPUs), and the like. In some implementations, the processing unit(s) 104 may be configured to execute instructions stored in a non-transitory computer readable-media 116 of the memory 106. Although the non-transitory computer-readable media 116 is shown in FIG. 1 as included in the memory 106, it may be appreciated that instructions executable by the processing unit(s) 104 may be additionally, or alternatively, stored in another data storage location having non-transitory computer-readable media.

In some embodiments, a non-transitory computer-readable medium is embedded with, or includes, instructions for receiving, using an input of the computational platform 100, parameter information corresponding to a quantum structure, and generating, using a processor or processing unit(s) 104 of the computational platform 100, a quantum structure model based on the parameter information received. The medium may also include instructions for determining, using the processor or processing unit(s) 104, at least one property of the quantum structure, and generating a report indicative of the at least one property determined. In one non-limiting example, at least some of the instructions for carrying out methods, in accordance with the present disclosure, may be programmed into, executed using, or part of, a commercial software package, such as a COMSOL, or Matlab.

In some configurations, the processing unit(s) 104 may include one or more dedicated processing units or modules configured (e.g. hardwired, or pre-programmed) to carry out steps, in accordance with aspects of the present disclosure. For instance, as shown in FIG. 1, the processing unit(s) 104 may include a Strain solver module 118, a Piezoelectric solver module 120, and a Schrödinger solver module 122, or a combination thereof. In particular, each solver module may be configured to perform a specific set of processing steps, or carry out a specific computation, and provide specific results. For example, the Strain solver module 118 may be configured to compute and provide various strain information, such as strain values, strain tensors, strain profiles, strain symmetry, and so on. The Piezoelectric solver module 120 may be configured to compute and provide piezoelectric information, such as piezoelectric charge distribution, piezoelectric potential energy and so on. The Schrödinger solver module 122 may be configured to compute and provide quantum mechanical information, such as Hamiltonians, potentials, wavefunctions, eigenstates, eigen-energies, and so on.

Solver modules of the processing unit(s) 104 may operate independently, or in cooperation with one another. In the latter case, the modules can exchange information and data, allowing for more efficient computation, and thereby improvement in the overall processing by the processing unit(s) 104. For instance, the Strain solver module 118 may generate a finite element method (FEM) mesh, according to accuracy requirements specified by a user via I/O modules 102, for example, and solve coupled partial differential equations to obtain displacement vectors, and strain tensors therefrom.

Strain calculation results (e.g. computed strain tensors) may then be provided to the Piezoelectric solver module 120, which may then use the strain calculation results to calculate piezoelectric information (e.g. charge distribution). In addition, the Strain solver module 118 may also provide the generated FEM mesh to the Piezoelectric solver module 120, which may then use it to calculate piezoelectric potential energy based on the Poisson equation.

Strain calculation results (e.g. computed strain tensors) and Piezoelectric solver results may then be provided to the Schrödinger solver module 122, which may then use the strain calculation results and Piezoelectric calculation results to obtain quantum mechanical information (e.g. Hamiltonians, wavefuctions, eigenstates, or eigen-energies). In addition, the Strain solver module 118 may also provide the generated FEM mesh to the Schrödinger solver module 122 or the Schrödinger solver module 122 may generate a second, different finite element method (FEM) mesh, according to accuracy requirements specified by a user via I/O modules 102, which may then use it to calculate quantum mechanical results.

As appreciated from the above, having specialized solver modules allows multiple calculations to be performed simultaneously or in substantial coordination, thereby increasing processing speed. In addition, sharing data and information between the different solver modules can prevent duplication of time-consuming processing and computations, thereby increasing overall processing efficiency.

In some implementations, the processing unit(s) 104 may also generate various instructions, design information, or control signals for designing or manufacturing a quantum structure, or quantum structure array/assembly, in accordance with computations performed. For example, based on computed deformations, strain, polarization charge distribution, and other information or quantities computed, the processing unit(s) 104 may identify and provide an optimal method for designing, manufacturing, or adapting design or manufacture of, a quantum structure, or quantum structure array/assembly.

The processing unit(s) 104 may also be configured to generate a report and provide it via the I/O modules 102. The report may be in any form and provide various information. For instance, the report may include various numerical values, text, graphs, maps, images, illustrations, and other renderings of information and data. In particular, the report may provide various strain, piezoelectric, and other information or properties generated by the processing unit(s) 104 for one or more quantum structures. The report may also include various instructions, design information, or control signals for manufacturing a quantum structure, or quantum structure array/assembly. To this end, the report may be provided to a user, or directed via the communication network 108 to an assembly line 114 or various hardware, computers or machines therein.

Figure 2:
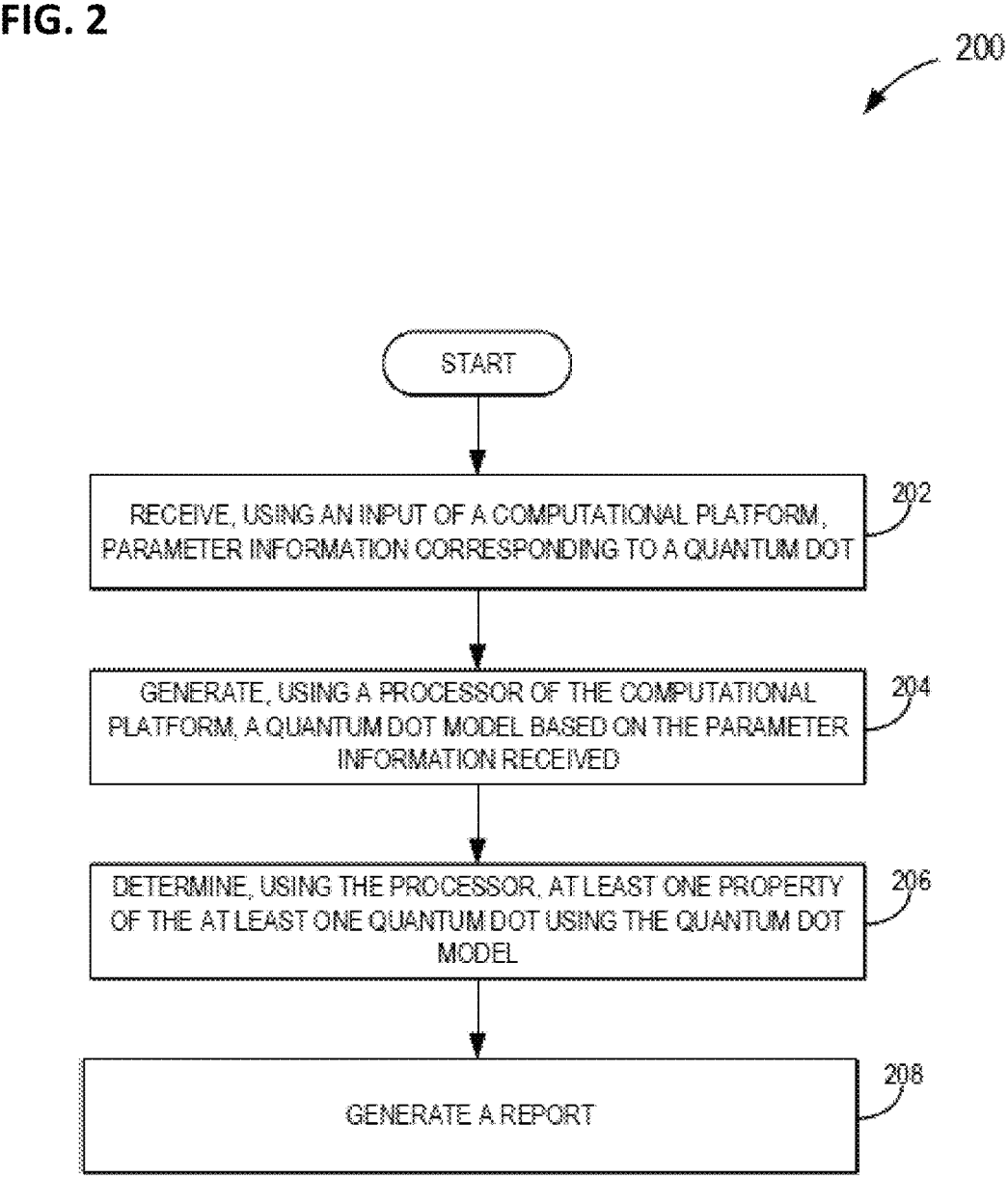
FIG. 2 is a flowchart setting forth steps of a process, in accordance with aspects of the present disclosure.

Referring now to FIG. 2, a flowchart setting forth steps of a process 200, in accordance with aspects of the present disclosure, is shown. Steps of the process 200 may be carried out using any suitable device, apparatus, or system, such as the computational platform 100 described herein. Steps of the process 200 may be implemented as a program, firmware, software, or instructions that may be stored in non-transitory computer readable media and executed by a general-purpose, programmable computer, processor, or other suitable computing device. In some implementations, steps of the process 200 may also be hardwired in an application-specific computer, processor or dedicated module (e.g. solver modules).

As shown, the process 200 may begin at process block 202 with receiving, using an input of a computational platform, various parameter information corresponding to a quantum structure, such as a QD as shown in FIG. 2, and its corresponding matrix. By way of example, parameter information may include geometrical parameters (e.g. shape, size, orientation), as well as material parameters, such as lattice constants, elastic coefficients, band hydrostatic potentials, spin-orbit couplings, band-gaps, band energies, piezoelectric coefficients, stiffness, anisotropies, and so forth. Parameter information may be provided by user, and/or accessed from a memory, server, database, or other storage location. Exemplary geometric parameters are provided in FIGS. 3A-3C. Exemplary material parameters corresponding to a quantum structure and its corresponding matrix is provided in Table 1.

Based on the parameter information received, at process block 204, a quantum structure model may be generated using at least one processor of a computational platform 100. As will be described, the quantum structure model relies on a framework that includes the generation of a mesh representing the quantum structure suitably allowing one to obtain one or more quantum structure properties by solving a set of partial differential equations implementable using a finite element method (FEM). Using the quantum structure model, at least one property of the quantum structure may be determined, as indicated by process block 206. Exemplary properties of the quantum structure may include electrical properties, transport properties, optical properties, elastic properties, and other properties described herein.

In one non-limiting implementation of process blocks 202-206, material and geometric parameters for a quantum structure and surrounding matrix are provided. The parameters are then used to generate a quantum structure model that includes coupled partial differential equations. To solve the model, a FEM mesh is generated, according to accuracy requirements specified by a user. The model may then be solved using a Strain solver module to generate a displacement vector $\vec{u}$, which in turn may be used to calculate a strain tensor $\bar{\varepsilon}$.

The strain tensor $\bar{\varepsilon}$ may be inputted into a Piezoelectric (potential) solver to calculate a strain induced charge distribution $\sigma_P$ and a piezoelectric energy change $\delta E_{Piezo}$. Using the same, or a different FEM mesh, the Piezoelectric solver may solve the Poisson equation and calculate a polarization induced potential $V_P$.

Strain and piezoelectric potential distributions from the Strain solver and piezoelectric solver may then be inputted into a Schrödinger (equation) solver. A new mesh may be generated, if necessary. The Schrödinger solver may then use the properties determined by the Strain solver and Piezoelectric solver to obtain quantum mechanical properties. Suitably, the Schrödinger solver may use k·p theory to obtain wavefunctions or states corresponding to the quantum structure, as well as associated energies, coefficients, and the like. When k·p theory is used, the Schrödinger solver may obtain a solutions for 8 coupled partial differential equations using FEM and evaluate symmetries of solutions using group theory. By evaluating the symmetries of the solutions, the Schrödinger solver may be used to identify spurious solutions or reduce the computational load.

Referring again to FIG. 2, a report may then be generated at process block 208. The report may be in any form and provide various information. As described, the report may provide various strain, piezoelectric, and other information or properties corresponding to the one or more quantum structure. The report may also include various instructions, design information, or control signals for designing or manufacturing a quantum structures, or quantum structures array/assembly.

The present framework will now be introduced for 3-dimensional QDs. Specifically, for a QD system with a QD embedded in a matrix, the strain tensor $\bar{\varepsilon}$ of rank 2 may be defined as:

$$\bar{\varepsilon} = \frac{1}{2}\left[(\nabla \vec{u}) + (\nabla \vec{u})^T\right] + \bar{\varepsilon}_{MM}^0 \quad (1)$$

or $$\varepsilon_{ij} = \frac{1}{2}\left(\frac{\partial u_i}{\partial x_j} + \frac{\partial u_j}{\partial x_i}\right) + \varepsilon_{MM}^0 \delta_{ij}$$

In Eqn. (1), the superscript T denotes the transpose operation; the displacement vector $$\vec{u} = u_x \vec{e}_x + u_y \vec{e}_y + u_z \vec{e}_z$$

is from the originally matched position; and $\bar{\varepsilon}_{MM}$ is the mismatch strain tensor due to the crystal lattice constant difference between the QD and the surrounding matrix. $\varepsilon_{MM}^0$ may be defined as:

$$\varepsilon_{MM}^0 = \begin{cases} \dfrac{a_M - a_Q}{a_Q} & \text{(inside } QD\text{)} \\ 0 & \text{(in the matrix)} \end{cases} \quad (2)$$

where $a_M$ and $a_Q$ are lattice constants in the matrix and QD, respectively. From Eqn. (1), it may be shown that $\varepsilon_{ij}=\varepsilon_{ji}$. The stress tensor, which is also of rank 2, may be then calculated using the following equation:

$$\bar{\sigma} = C^{(4)}:\bar{\varepsilon}$$

or $$\sigma_{ij} = C_{ijkl}\varepsilon_{kl} \quad (3)$$

In Eqn. (3), $C^{(4)}$ is the fourth rank elasticity tensor, ":" denotes the dyadic tensor product, and the Einstein summation notation has been used. For common semiconductor materials with a cubic crystalline lattice (e.g. InAs, and GaAs), the symmetry relations reduce the coefficients of $C^{(4)}$ to three independent terms, namely $C^{11}$, $C^{12}$ and $C^{44}$. Therefore, using $\sigma_{ij}=\sigma_{ji}$, the stress tensor in Eqn. (3) can be simplified as follows:

$$\begin{pmatrix}\sigma_{xx}\\\sigma_{yy}\\\sigma_{zz}\\\sigma_{xy}\\\sigma_{xz}\\\sigma_{yz}\end{pmatrix} = \begin{pmatrix}C_{11} & C_{12} & C_{12} & 0 & 0 & 0\\C_{12} & C_{11} & C_{12} & 0 & 0 & 0\\C_{12} & C_{12} & C_{11} & 0 & 0 & 0\\0 & 0 & 0 & 2C_{44} & 0 & 0\\0 & 0 & 0 & 0 & 2C_{44} & 0\\0 & 0 & 0 & 0 & 0 & 2C_{44}\end{pmatrix}\begin{pmatrix}\varepsilon_{xx}\\\varepsilon_{yy}\\\varepsilon_{zz}\\\varepsilon_{xy}\\\varepsilon_{xz}\\\varepsilon_{yz}\end{pmatrix} \quad (4)$$

or

-continued $$\begin{pmatrix} \sigma_{xx} & \sigma_{xy} & \sigma_{xz} \\ & \sigma_{yy} & \sigma_{yz} \\ & & \sigma_{zz} \end{pmatrix} = \tag{5}$$

$$\begin{pmatrix} C_{11}u_{x,x} + & & \\ C_{12}(u_{y,y}+u_{z,z}) & C_{44}(U_{x,y}+u_{y,x}) & c_{44}(u_{x,z}+u_{z,x}) \\ & C_{11}u_{y,y}+C_{12}(u_{x,x}+u_{z,z}) & C_{44}(u_{y,z}+u_{z,y}) \\ & & C_{11}u_{z,z} + \\ & & C_{12}(u_{x,x}+u_{y,y}) \end{pmatrix} +$$

$$\begin{pmatrix} (C_{11}+2C_{12})\varepsilon_{MM}^0 & 0 & 0 \\ & (C_{11}+2C_{12})\varepsilon_{MM}^0 & 0 \\ & & (C_{11}+2C_{12})\varepsilon_{MM}^0 \end{pmatrix}$$

where $$u_{i,j} = \frac{\partial u_i}{\partial x_j}.$$

In addition, one can write $$-\nabla \cdot \vec{\sigma} = \vec{f} \tag{6}$$

or $$-\frac{\partial \sigma_{lk}}{\partial x_i} = f_k$$

where, the external force $\vec{}$ can be set to zero. Substituting Eqns. (5) and (2) into Eqn. (6), three coupled second-order partial differential equations may be obtained for $\vec{e}_x$. The boundary conditions at the interface between the QD and the matrix are $$\vec{n} \cdot \vec{\sigma}|_{QD} = \vec{n} \cdot \vec{\sigma}|_{Matrix} \tag{7}$$

In Eqn. (7), $\vec{n}$ is the normal directional unit vector of the interface. At the outer boundary of the matrix, far away from the QD, Dirichlet boundary can be applied, as follows:

$$\vec{u}|_{\text{Outer Boundary}} = 0. \tag{8}$$

The displacement vector $\vec{u}$ be then be obtained by solving the second order anisotropic partial differential equations using Eqns. (5) and (6) with boundary conditions from Eqns. (7) and (8). In turn, the strain tensor $\bar{\varepsilon}$ may be obtained by substituting the displacement vector $\vec{u}$ into Eqn. (1). For the conduction band, the potential energy change is hydrostatic, and may be expressed as:

$$\delta E_{hy}^C = a_c(\varepsilon_{xx}+\varepsilon_{yy}+\varepsilon_{zz}), \tag{9}$$

where $a_c$ is the conduction band hydrostatic deformation potential energy. For the valence band, both hydrostatic and biaxial deformations exist, and the biaxial deformation causes the heavy hole and light hole bands to split.

$$\delta E_{hy}^V = -a_v(\varepsilon_{xx}+\varepsilon_{yy}+\varepsilon_{zz}) \tag{10}$$

$$\delta E_{bi}^V = -\frac{b_v}{2}(\varepsilon_{xx}+\varepsilon_{yy}-2\varepsilon_{zz}),$$

where $a_v$ and $b_v$ are valence band hydrostatic and biaxial deformation energies, respectively. Due to strain-induced electric polarization, the piezoelectric effect can also modify the potential energy profile of the QD system. The resulting linear and quadratic polarization can then be expressed as:

$$\vec{P}_{linear} = 2e_{14}(\varepsilon_{yz}\vec{e}_x + \varepsilon_{xz}\vec{e}_y + \varepsilon_{xy}\vec{e}_z)$$

$$\vec{P}_{quad} = 2B_{114}(\varepsilon_{xx}\varepsilon_{yz}\vec{e}_x + \varepsilon_{yy}\varepsilon_{xz}\vec{e}_y + \varepsilon_{zz}\varepsilon_{xy}\vec{e}_z) + 2B_{124}$$
$$[\varepsilon_{yz}(\varepsilon_{yy}+\varepsilon_{zz})\vec{e}_x + \varepsilon_{xz}(\varepsilon_{xx}+\varepsilon_{zz})\vec{e}_y + \varepsilon_{xy}(\varepsilon_{xx}+\varepsilon_{yy})$$
$$\vec{e}_z] + 4B_{156}(\varepsilon_{xy}\varepsilon_{xz}\vec{e}_x + \varepsilon_{xy}\varepsilon_{yz}\vec{e}_y + \varepsilon_{xz}\varepsilon_{yz}\vec{e}_z)$$

$$\vec{P} = \vec{P}_{linear} + \vec{P}_{quad} \tag{11}$$

The polarization charge, piezoelectric potential, and resulting piezo-induced energy terms can then be written as:

$$-\nabla \cdot \vec{P} = \sigma_P$$

$$-\nabla \cdot \varepsilon_0 \varepsilon_r \nabla V_P = \sigma_P$$

$$\delta E_{Piezo} = -eV_P \tag{12}$$

In Eqn. (12), $\sigma_P$ is the induced polarization charge density; $\varepsilon_0$ and $\varepsilon_r$ are the vacuum and semiconductor relative permittivity constants, respectively. $V_P$ is the resulting piezo-potential and e is the elementary charge.

Finally, the deformed edges of the conduction and valence bands due to strain and piezoelectric effects can be written as $$E_C = E_{C0} + \delta E_{hy}^C + \delta E_{Piezo}$$

$$E_{HH} = E_{V0} - (\delta E_{hy}^V + \delta E_{bi}^V) + \delta E_{Piezo}$$

$$E_{LH} = E_{V0} - (\delta E_{hy}^V - \delta E_{bi}^V) + \delta E_{Piezo}$$

$$E_{C0} = E_g + E_{V0}$$

$$E_{V0} = E_{v,ave} + \frac{1}{3}\Delta \tag{13}$$

In Eqn. (13), $E_{CO}$ and $E_{VO}$ are bulk material conduction band and valence band edge energies, respectively. $\Delta$ is the spin-orbit coupling energy, and $E_g$ is the band gap of the bulk semiconductor material.

Unlike prior techniques reported, the above-described framework based on partial differential equations may be readily implemented using a standard FEM solver, and may be naturally reduced to 2D equations for quantum wires and 1D equations for quantum wells. Additionally, if an external force or stress is applied to the QD system, as common in sensor applications, for example, such external effects may be readily included using the force term of Eqn. (6).

Generally, carrier bound state energies and wavefunctions in a quantum dot (QD) are determined by the potential profile as a whole. Numerical continuum elasticity models, treating the QD and surrounding matrix as continuous materials, provide a good compromise between the computation complexity and accuracy. In contrast to atomistic models, numerical continuum elasticity models are much more efficient and provide results that are accurate enough for most applications. Moreover, unlike the atomistic models, the model inputs, semiconductor elasticity coefficients and band parameters, are easy to obtain.

Therefore, the present disclosure provides a framework based on a continuum elasticity model approach. Using a finite element method (FEM), the potential symmetry reduction of a QD system due to strain and piezoelectric effects is systematically investigated. Compared with other numerical approaches, such as finite volume methods, FEM is more versatile and suitable for various QD geometric shapes, and the boundary conditions can be naturally implemented and satisfied without any specific treatment. Additionally, a search for the minimum strain energy configuration is not required in the present framework.

By way of example, the following description illustrates how the present framework can be applied to compute strain and resulting band energy changes for various QD systems. Although the focus of the following is on pyramidal QDs, other QD shapes may be possible. As such, in some instances, comparisons are made with circular lens-shaped QDs or half-ellipsoidal QDs. These different QD shapes are shown in FIGS. 3A-3C.

As described below, strain deformation and piezoelectric potential profiles inside a QD need not be homogeneous. Specifically, results herein show that the minimum bandgap for a symmetric QD, such as a pyramidal QD, is found at the base or the top of the QD, not at its geometric center. Bandgap variations were also investigated for different QD shapes and sizes. In addition, for InAs/GaAs or other III-V group zinc-blende crystal quantum dots, it is shown that maximum symmetry group for the Hamiltonian is $C_{2v}$ double group. This group has two symmetric reflection planes: (110) and (1$\overline{1}$0), which pass through the central axis of the symmetric QD, and one symmetric rotation of 180° along the central axis. Any QD with these three symmetric operations will reach the maximum $C_{2v}$ double group symmetry independent of the QD's original geometric symmetry group. However, if the geometric group only partially has or does not have these three symmetric operations, the Hamiltonian's symmetric group will be reduced to the subgroup of $C_2$ double group or have no symmetry at all.

Referring now to FIGS. 3A-3C, the base of a pyramidal QD is in the xy or (001) plane. The central axis of the QD is along the z, or [001] direction, passing the base center which is the origin of the coordinate system shown. The base side-lines of the pyramid are along x, or [100], and y, or [010] directions, with side length d, respectively. The base radius of the lens shape QD is r. The long axis of the ellipsoidal QD is along the x or [100] direction with its half-length a; and the short axis is along y or [010] direction with its half-length b. The heights of the QDs are denoted as h. In our latter calculation, unless we specify other numbers, we will set d=10 nm, r=5 nm, a=5 nm, b=4 nm, and h=5 nm. In our calculation, we assume the QD is InAs, and the surrounding matrix is GaAs. The material parameters are listed in Table 1.

TABLE 1

Material parameters for InAs and GaAs

| Symbol | [unit] | Quantity | InAs | GaAs |
|---|---|---|---|---|
| $\alpha_0$ | [Å] | Lattice Constant | 5.6533 | 6.0584 |
| $C_{11}$ | [dyne/cm$^2$] | Elastic Coefficient | 11.879 | 8.329 |
| $C_{12}$ | [dyne/cm$^2$] | Elastic Coefficient | 5.376 | 4.526 |
| $C_{44}$ | [dyne/cm]$^2$ | Elastic Coefficient | 5.940 | 3.960 |
| $\alpha_c$ | [eV] | C band hydro. potential | −7.17 | −5.08 |
| $\alpha_v$ | [eV] | V band hydro. potential | 1.16 | 1.00 |
| b | [eV] | V band biaxial potential | −1.7 | −1.8 |
| Δ | [eV] | Spin-orbit coupling | 0.34 | 0.38 |
| $E_g$ | [eV] | Band-gap | 1.424 | 0.354 |
| $E_{v,avg}$ | [eV] | Average valence band energy | −6.92 | −6.67 |
| $e_{14}$ | [C/m$^2$] | Piezoelectric Coefficient | −0.115 | −0.238 |
| $B_{114}$ | [C/m$^2$] | Piezoelectric Coefficient | −0.531 | −0.439 |
| $B_{124}$ | [C/m$^2$] | Piezoelectric Coefficient | −4.076 | −3.765 |
| $B_{156}$ | [C/m$^2$] | Piezoelectric Coefficient | −0.120 | −0.492 |

In some applications, it may be important to identify the potential profile change due to the strain and its consequence to the QD's symmetry reduction. Without strain effect, the potential energy symmetry of a QD system is determined by its geometric shape. For example, for the pyramidal QD shown FIGS. 3A-3C, the symmetric operations include rotations along the central axis of π/4×n (n=1, 2, 3, 4) and reflections with (100), (010), (110), and (1$\overline{1}$0) planes which all pass through the central axis. In other words, the symmetric group is $C_{4v}$. For the lens shaped QD, the symmetry group is $C_{\infty v}$; and for the half-ellipsoid, the symmetry group is $C_{2v}$.

Referring now to FIGS. 4A-4D, the hydrostatic deformation potential of the valence bands $$\delta E_{hy}^V = -a_v(\varepsilon_{xx}+\varepsilon_{yy}+\varepsilon_{zz}).$$

are shown. For conduction band, the symmetric profile of $$\delta E_{hy}^C$$

is expected to be similar as appreciated from Eqns. (9) and (10). Specifically, FIGS. 4A and 4B show $$-\delta E_{hy}^V$$

profiles for the pyramid QD. FIGS. 4C and 4D show the corresponding cases for the lens shape QD. In the latter figures, the xy plane is sliced around the vertical middle point of the dot, and x, y, z directions are the same as those denoted in FIGS. 4A and 4B. From FIGS. 4A-4D, it is apparent that hydrostatic deformation does not change potential energy symmetry of the pyramidal QD. The deformation is larger at the edge of the pyramid. Along the vertical z direction, the base deformation is smaller than at the pyramid's top. By comparison, FIG. 4C shows that hydrostatic deformation reduces the lens symmetry from $C_{\infty v}$ to $C_{4v}$, making the lens potential energy's symmetric group the same as the pyramid case. This is more visible in the matrix and at the edge of the lens. The symmetric reduction likely results from the cubic symmetry of the semiconductor crystal, which may be applied to simplify the stress tensor coefficient calculation.

Referring particularly to FIGS. 5A-5D, the biaxial deformation potential $$-\delta E_{bi}^V = -\frac{b_v}{2}(\varepsilon_{xx} + \varepsilon_{yy} - 2\varepsilon_{zz}).$$

is shown for the pyramidal and lens shape QDs. The potential symmetric features are identical to the hydrostatic cases, i.e., $C_{4v}$. However, in the vertical z direction, the biaxial deformation change is more dramatic. Specifically, the biaxial potential may have different signs within the QD. In the pyramid case, as shown in FIG. 5B, the sign of $$-\delta E_{bi}^V$$

changes from being positive at the bottom of the pyramid, zero near middle of central axis, and negative at the top.

Figure 6:
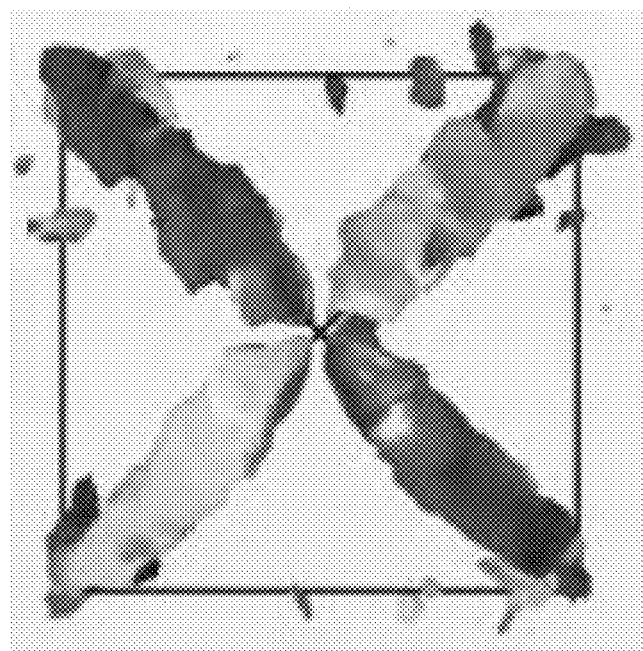
FIG. 6 are graphical illustrations showing an exemplary polarization charge distribution in a QD (green indicates positive charge, and blue indicates negative charge).

The polarization charge distribution in the pyramidal QD system is shown in FIG. 6. As appreciated from the figure, charges are accumulated near the side edges of the dot. The distribution has $C_{2v}$ symmetry with the following symmetric operations: 180° rotation along the central axis; and two symmetric reflections with (110) and (1$\overline{1}$0) planes, which pass through the central axis. For the lens shape QD, the results are similar. This is likely due to the fact that there is no inversion center for InAs or GaAs crystals, which is an intrinsic property of the crystal. Because of the $C_{2v}$ symmetric charge distribution, the resulting piezoelectric potential energy has a similar feature.

FIGS. 7A-7D show piezoelectric $$\delta E_{Piezo} = -eV_P$$

profiles (in eV) for a pyramid, a circular-based lens, and half-ellipsoid QDs. As appreciated from FIGS. 7A-7D, piezoelectric effect reduces the potential energy symmetry of the pyramid and lens QD to $C_{2v}$. It is interesting to check the half-ellipsoid in FIG. 7 where the geometric symmetry group is also $C_{2v}$; however, the symmetric reflection planes for the geometric shape are xz (010) and yz (100) planes, which are not the same as the piezoelectric potential symmetric planes. In this case, the resulted potential symmetry group is reduced to $C_2$, i.e., the only symmetric operation is 180° rotation along the central axis. From FIGS. 7A-7D, it may be noted that compared with hydrostatic and biaxial deformations, piezoelectric potential expands more into the matrix region because electromagnetic force has a longer interaction range. In most cases, the largest piezoelectric potential occurs in the matrix instead of in the dot. In the QD base, the piezoelectric potential is nearly zero.

With consideration to deformations, the transition energy from the edges of conduction band to heavy hole band (C-HH) and light hole band (C-LH) can be calculated as follows, $$E_{C\text{-}HH} = E_C - E_{HH}$$

$$E_{C\text{-}LH} = E_C - E_{LH} \qquad (14)$$

Figure 8:
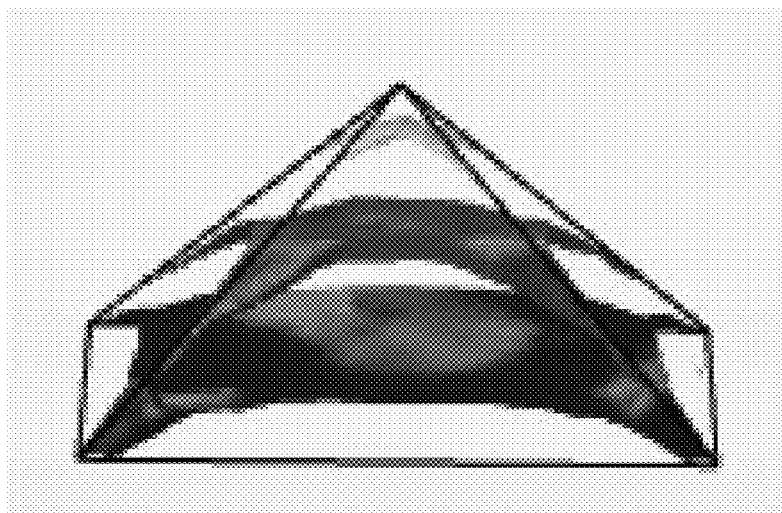
FIG. 8 is a graphical illustration showing exemplary bandgap isosurfaces between the edge of the conduction to the heavy-hole bands in a pyramidal QD.

In FIG. 8, the bandgap $$E_{C\text{-}HH}$$

isosurface of 0.75 eV, 0.95 eV, and 1.15 eV for a pyramidal QD is shown. It is observed that the bandgap between the conduction band to the heavy hole bands is smallest at the pyramidal base and largest at the top of the pyramid. For $$E_{C\text{-}LH},$$

which is not shown in the figure, the situation is inverted, namely the largest band gap is around the base, and the smallest band gap is at the top.

Figure 9A:
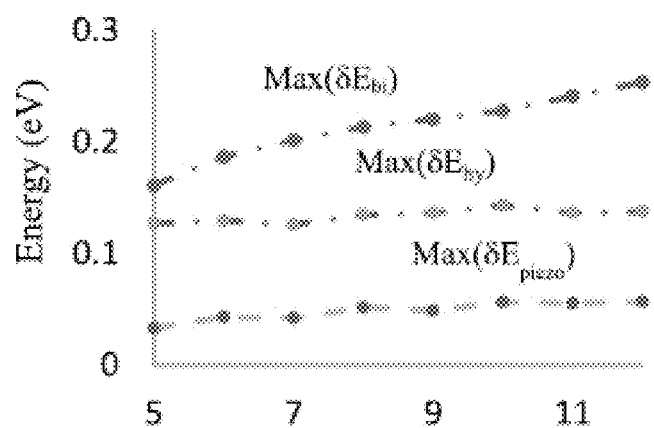
FIGS. 9A-9C are graphs showing exemplary (FIG. 9A) maximum valence band hydrostatic, biaxial, and piezo deformation energies.

The effects due to QD size and shape variations were also investigated. Specifically, the band gap changes were analyzed as a function of pyramidal QD shape and size. First, the pyramid height was fixed to a constant, namely h=5 nm, and the base side-length d was varied between 5 nm up to 12 nm, i.e., the aspect radio R=h/d varied from 1 to 0.42. As seen in FIG. 9A, as R got smaller, or the pyramid gets flatter, the valence band biaxial deformation became stronger. The hydrostatic deformation change, however, was almost negligible. The piezoelectric potential, as a high order shear effect, also increased, with its magnitude normally being much smaller than the hydrostatic and biaxial deformations. The piezoelectric potential energy increases because more charges accumulate when the edges get longer.

Figure 9B:
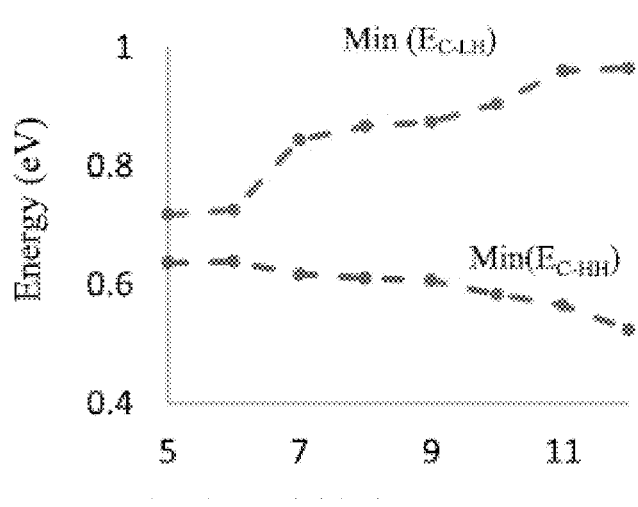
Figure 9C:
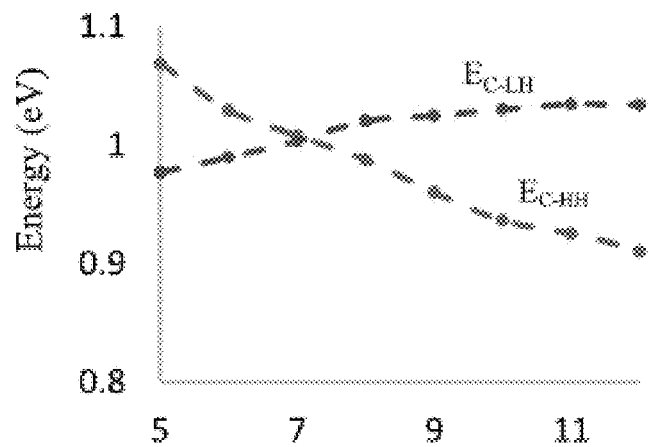

However, piezoelectric potential itself has no effect on the bandgap. Specifically, FIG. 9B show the minima of the EC-HH, which normally is at the base region, and the minima of EC-LH, which is normally at the top of the QD. As the biaxial deformation increased, the heavy hole and light hole band edges split more, resulting in in EC-LH increasing, and EC-HH decreasing as shown FIG. 9B. In FIG. 9C, changes of the bandgap at the geometric center (0, 0, h/2) of the pyramid are shown. The transitions followed the same trend as the minima in FIG. 9B. However, as illustrated in FIG. 5B, sometimes, the center point biaxial deformation can be zero. In this case, calculations show that around d=7 nm, the heavy hole and light hole bands do not split. The aspect ratio was fixed to R=0.5, and d and h were varied accordingly to vary the size of pyramid. The calculations reveal that with R as a constant, both hydrostatic and biaxial deformation changes are almost non-existent. As a result, the effect of this conformal size change on the bandgap is nearly negligible.

The above described model and its numerical implementation provide a practical and efficient computation platform for the characterization and rational design of QWR materials.

Shear strain profiles and their symmetry were also determined for pyramidal QDs. Specifically, in the calculation, shear strain terms $\varepsilon_{xy}$, $\varepsilon_{xz}$, and $\varepsilon_{yz}$ appear in the 4×4, 6×6 and 8×8 Hamiltonians of the k·p theory method, relating to the band mixing effect. As second order tensors, shear strain terms $\varepsilon_{xy}$, $\varepsilon_{xz}$, and $\varepsilon_{yz}$ have intrinsic transformation properties. But it should be noted that the symmetric properties of these tensors rely on the quantum structure geometry and material properties. For example, the hydrostatic potentials in Eqns. (9) and (10) have $C_{4v}$ symmetry instead of spherical symmetry for the pyramid QD as demonstrated in FIGS. 4A-4D. The shear stain profiles of the pyramid QD are shown in FIGS. 10A-10C. From the profiles computed, it is may be readily identified that under the operations of $C_{4v}$, $\varepsilon_{xz}$ has the same symmetric properties as $k_x k_z$ of the k vector in k·p theory; $\varepsilon_{yz}$ has the same symmetric properties as $k_y k_z$; and $\varepsilon_{xy}$ has the same symmetric properties as $k_x k_y$.

Herein, symmetry reduction of potential profile in the quantum structure and surrounding matrix was shown. Hydrostatic and biaxial deformations intrinsically displayed $C_{4v}$ symmetry because of semiconductor cubic crystal structure. Normally, these two deformations are localized within or near the QD. Piezoelectric effects, however, induced an accumulation of polarization charges along the edges of the pyramidal QD; and consequently, a long-range electric potential is built up, expanding far into the matrix. The piezoelectric potential had an intrinsic $C_{2v}$ symmetry with the following symmetric operations: two vertical reflection planes (110) and (1$\bar{1}$0) passing through the central axis, and the rotation of 180° along the central axis of the symmetric QD. The total resulting deformation potential had $C_{2v}$ symmetry. Therefore, the maximum symmetry group for an InAs/GaAs or other zinc-blende QD was $C_{2v}$, depending on the orientation of the QD. A circular-based lens shaped QD ($C_{\infty v}$ geometric symmetry), or pyramidal QD ($C_{4v}$ geometric symmetry), with the orientation shown in FIG. 3A, has $C_{2v}$ symmetry, which is the maximum symmetry the QD can reach. This is likely because the deformation potential symmetric group $C_{2v}$ is a subgroup of the QD's geometric symmetry groups.

However, for the half-ellipsoidal QD with geometric $C_{2v}$ symmetry as shown in FIG. 3C, the geometric reflection planes are not the same as those of deformation potential symmetry group $C_{2v}$. The symmetry group of this orientation QD is reduced to $C_2$, which is subgroup of $C_{2v}$. Similarly, if the pyramid in FIG. 3A is rotated along the central axis to make the geometric reflection planes to (2, 1, 0) and (1, 2, 0), respectively, the new pyramid potential profile would also have $C_2$ symmetry. Herein, it was also shown that shear strain potentials, which are related to the band mixing effect, have the same symmetric properties as the k vector of k·p theory under $C_{4v}$ operations. It was also found that for a QD, the band gap distribution was not uniform within the dot. Specifically, for a pyramidal QD, the smallest C-HH transition was around the base, and the smallest C-LH transition was around the top. In designing the band gap of a QD system, the aspect ratio of the dot was shown to have prominent effect due to the biaxial deformation. However, the bandgap shifts, which result from conformal change with the same aspect ratio, are almost invisible.

The present framework will now be introduced in 2 dimensions for QWRs. In FIGS. 11A-11B, the [100] direction is denoted as x axis; [010] direction is denoted as y-axis; and [001] direction is denoted as z-axis. For a QWR along [hk0] direction as shown in FIG. 1B, its physical properties have no spatial dependence on x'. The new coordinate system (x', y', z) is obtained by rotating the original (x, y, z) system counterclockwise about the z-axis by θ, with $\tan(\theta) = k/h$.

Any vector V, such as the material position $r = (x, y, z)^T$, displacement $u = (u_x, u_y, u_z)^T$ due to the strain, and the piezoelectric polarization $P = (P_x, P_y, P_z)^T$, where the superscript T means transpose, is transformed between the two coordinate systems as follows, $$V' = \hat{R}(\theta) V \tag{15}$$

$$\hat{R}(\theta) = \begin{pmatrix} \cos(\theta) & \sin(\theta) & 0 \\ -\sin(\theta) & \cos(\theta) & 0 \\ 0 & 0 & 1 \end{pmatrix}.$$

The semiconductor strain is expressed as a rank two symmetric tensor in the following form $$\varepsilon_{ij} = \frac{1}{2}(u_{i,\partial j} + u_{j,\partial i}) + \delta_{ij}\varepsilon_{MM}^0 \tag{16}$$

$$\varepsilon_{MM}^0 = \begin{cases} \dfrac{a_M - a_Q}{a_Q} & \text{(Inside of the wire)} \\ 0 & \text{(Outside of the wire)} \end{cases}$$

$$u_{i,\partial j} = \frac{\partial u_i}{\partial r_j}, \ (i, j \in \{x, y, z\}).$$

In Eqn. (16), $a_M$ and $a_Q$ are the lattice constants of the matrix and the QWR, respectively, and $\varepsilon_{MM}^0$ is the intrinsic strain due to the lattice mismatch. The stress $\sigma_{ij}$ is also a rank two symmetric tensor. For these rank two tensors, they can be expressed as a 3×3 symmetric matrices, $$\overline{\varepsilon} = \begin{pmatrix} \varepsilon_{xx} & \varepsilon_{xy} & \varepsilon_{xz} \\ & \varepsilon_{yy} & \varepsilon_{yz} \\ & & \varepsilon_{zz} \end{pmatrix}, \ \overline{\sigma} = \begin{pmatrix} \sigma_{xx} & \sigma_{xy} & \sigma_{xz} \\ & \sigma_{yy} & \sigma_{yz} \\ & & \sigma_{zz} \end{pmatrix}. \tag{17}$$

The transformation of rank two tensors between the two coordinate systems can be expressed as $$\varepsilon'_{ij} = \hat{R}_{ik}\hat{R}_{jl}\varepsilon_{kl} = \hat{R}_{ik}\varepsilon_{kl}\hat{R}_{ij}^T, \tag{18}$$

or in the matrix form $$\overline{\varepsilon}' = \hat{R}(\theta)\overline{\varepsilon}\hat{R}^T(\theta), \ \text{and} \ \overline{\sigma}' = \hat{R}(\theta)\overline{\sigma}\hat{R}^T(\theta). \tag{19}$$

Because of symmetry, the strain and stress tensors only have six independent components. We rewrite Eqn. (19) as $$\begin{pmatrix} \varepsilon'_{x'x'} \\ \varepsilon'_{y'y'} \\ \varepsilon'_{zz} \\ \varepsilon'_{x'y'} \\ \varepsilon'_{x'z} \\ \varepsilon'_{y'z} \end{pmatrix} = \hat{K} \begin{pmatrix} \varepsilon_{xx} \\ \varepsilon_{yy} \\ \varepsilon_{zz} \\ \varepsilon_{xy} \\ \varepsilon_{xz} \\ \varepsilon_{yz} \end{pmatrix}, \begin{pmatrix} \sigma'_{x'x'} \\ \sigma'_{y'y'} \\ \sigma'_{zz} \\ \sigma'_{x'y'} \\ \sigma'_{x'z} \\ \sigma'_{y'z} \end{pmatrix} = \hat{K} \begin{pmatrix} \sigma_{xx} \\ \sigma_{yy} \\ \sigma_{zz} \\ \sigma_{xy} \\ \sigma_{xz} \\ \sigma_{yz} \end{pmatrix}, \ \text{with} \tag{20}$$

$$\hat{K} = \begin{pmatrix} \cos^2(\theta) & \sin^2(\theta) & 0 & \sin(2\theta) & 0 & 0 \\ \sin^2(\theta) & \cos^2(\theta) & 0 & -\sin(2\theta) & 0 & 0 \\ 0 & 0 & 1 & 0 & 0 & 0 \\ -\sin(2\theta)/2 & \sin(2\theta)/2 & 0 & \cos(2\theta) & 0 & 0 \\ 0 & 0 & 0 & 0 & \cos(\theta) & \sin(\theta) \\ 0 & 0 & 0 & 0 & -\sin(\theta) & \cos(\theta) \end{pmatrix}.$$

The elastic constitutive relation in the (x, y, z) system, $$\begin{pmatrix} \sigma_{xx} \\ \sigma_{yy} \\ \sigma_{zz} \\ \sigma_{xy} \\ \sigma_{xz} \\ \sigma_{yz} \end{pmatrix} = C^{(6\times 6)} \begin{pmatrix} \varepsilon_{xx} \\ \varepsilon_{yy} \\ \varepsilon_{zz} \\ \varepsilon_{xy} \\ \varepsilon_{xz} \\ \varepsilon_{yz} \end{pmatrix}, \tag{21}$$

where $C^{(6\times 6)}$ is the 6×6 elasticity matrix with three independent coefficients $C_{11}$, $C_{12}$ and $C_{44}$ can be transformed into the (x', y', z) system by left multiplication of the $\hat{K}$ on both sides of Eqn. (20). We obtain $$\begin{pmatrix} \sigma'_{x'x'} \\ \sigma'_{y'y'} \\ \sigma'_{zz} \\ \sigma'_{x'y'} \\ \sigma'_{x'z} \\ \sigma'_{y'x} \end{pmatrix} = C'^{(6\times 6)} \begin{pmatrix} \varepsilon'_{x'x'} \\ \varepsilon'_{y'y'} \\ \varepsilon'_{zz} \\ \varepsilon'_{x'y'} \\ \varepsilon'_{x'x} \\ \varepsilon'_{y'z} \end{pmatrix} \text{with} \tag{22}$$

$$C'^{(6\times 6)} = \hat{K} \cdot C^{(6\times 6)} \cdot \hat{K}^{-1} = \begin{pmatrix} C'_{11} & C'_{12} & C_{12} & C'_{14} & 0 & 0 \\ C'_{12} & C'_{11} & C_{12} & -C'_{14} & 0 & 0 \\ C_{12} & C_{12} & C_{11} & 0 & 0 & 0 \\ C'_{14}/2 & -C'_{14}/2 & 0 & C'_{44} & 0 & 0 \\ 0 & 0 & 0 & 0 & 2C_{44} & 0 \\ 0 & 0 & 0 & 0 & 0 & 2C_{44} \end{pmatrix}$$

where $$C'_{11} = \frac{1}{4}[3C_{11} + C_{12} + 2C_{44} + (C_{11} - C_{12} - 2C_{44})\cos(4\theta)]$$

$$C'_{12} = \frac{1}{4}[C_{11} + 3C_{12} - 2C_{44} - (C_{11} - C_{12} - 2C_{44})\cos(4\theta)]$$

$$C'_{14} = -\frac{1}{2}(C_{11} - C_{22} - 2C_{44})\sin(4\theta)$$

$$C'_{44} = \frac{1}{2}[C_{11} - C_{12} + 2C_{44} - (C_{11} - C_{12} - 2C_{44})\cos(4\theta)].$$

Considering that the QWR physical properties have no x' dependence in the (x', y', z) system, we have $$\begin{pmatrix} \varepsilon'_{x'x'} \\ \varepsilon'_{y'y'} \\ \varepsilon'_{zz} \\ \varepsilon'_{x'y'} \\ \varepsilon'_{x'x} \\ \varepsilon'_{y'z} \end{pmatrix} = \begin{pmatrix} 0 \\ u'_{y',\partial y'} \\ u'_{z,\partial z} \\ u'_{x',\partial y'}/2 \\ u'_{x',\partial z}/2 \\ (u'_{y',\partial z} + u'_{z,\partial y'})/2 \end{pmatrix} + \begin{pmatrix} \varepsilon^0_{MM} \\ \varepsilon^0_{MM} \\ \varepsilon^0_{MM} \\ 0 \\ 0 \\ 0 \end{pmatrix}. \quad (23)$$

Substituting Eqn. (23) into (22), we get the stress tensor in the (x', y', z) system $$\bar{\sigma} = \begin{pmatrix} \sigma'_{x'x'} & \sigma'_{x'y'} & \sigma'_{x'z} \\ & \sigma'_{y'y'} & \sigma'_{y'x} \\ & & \sigma'_{zz} \end{pmatrix} = \begin{pmatrix} \frac{C'_{14}}{2}u'_{x',\partial y'} + \frac{C'_{44}}{2}u'_{x',\partial y'} - \\ C'_{12}u'_{y',\partial y'} + \frac{C'_{14}}{2}u'_{y',\partial y'} & C_{44}u'_{x',\partial z} \\ C'_{12}u'_{z,\partial z} & & \\ & -\frac{C'_{14}}{2}u'_{x',\partial y'} + & \\ & C'_{11}u'_{y',\partial y'} + & C_{44}\begin{pmatrix} u'_{y',\partial z} + \\ u'_{z,\partial y'} \end{pmatrix} \\ & C'_{12}u'_{z,\partial z} & \\ & & C_{12}u'_{y',\partial y'} + \\ & & C_{11}u'_{z,\partial x} \end{pmatrix} + \begin{pmatrix} (C_{11} + 2C_{12})\varepsilon^0_{MM} & 0 & 0 \\ 0 & (C_{11} + 2C_{12})\varepsilon^0_{MM} & 0 \\ 0 & 0 & (C_{11} + 2C_{12})\varepsilon^0_{MM} \end{pmatrix}.$$

Finally, we obtain the coupled partial differential equations for the three dependent variables $u'=(u'_{x'}, u'_{y'}, u'_z)$ in the 2D QWR cross-sectional plane (y', z) by applying $$\nabla \cdot \bar{\sigma} = f', \quad (25)$$

where f' is the external force density, which should be set to zero for our cases.

From Eqn. (20), it is easy to show that hydrostatic and biaxial deformations are invariant under z axis rotation. For the conduction band, we can write the band hydrostatic deformation as $$\delta E_{hy}^C = a_C(\varepsilon'_{x'x'} + \varepsilon'_{y'y'} + \varepsilon'_{zz}), \quad (26)$$

where $a_c$ is the conduction band hydrostatic deformation energy coefficient. For the valence band, the hydrostatic and the biaxial deformation energies can be written as $$\delta E_{hy}^V = -a_v(\varepsilon'_{x'x'} + \varepsilon'_{y'y'} + \varepsilon'_{zz})$$

$$\delta E_{bi}^V = -b_v/2(\varepsilon'_{x'x'} + \varepsilon'_{y'y'} - 2\varepsilon'_{zz}), \quad (27)$$

where $a_v$ and $b_v$ are the valence band hydrostatic and biaxial deformation energy coefficients, respectively.

From Eqns. (15) and (20), the linear and quadratic electric polarizations induced by the piezoelectric effects can be expressed in the (x', y', z) system as $$P'_{linear} = \varepsilon_{14} \begin{pmatrix} 2[\varepsilon'_{x'z}\sin(2\theta) + \varepsilon'_{y'z}\cos(2\theta)] \\ 2[\varepsilon'_{x'z}\cos(2\theta) - \varepsilon'_{y'z}\sin(2\theta)] \\ 2\varepsilon'_{x'y'}\cos(2\theta) + (\varepsilon'_{x'x'} - \varepsilon'_{y'y'})\sin(2\theta) \end{pmatrix} \quad (28)$$

$$P'_{quad} = B_{134}\begin{pmatrix} 2\varepsilon'_{x'x'}\varepsilon'_{y'z}\cos(2\theta) + \\ \begin{pmatrix} \varepsilon'_{x'x'}\varepsilon'_{x'z} + \\ \varepsilon'_{x'x}\varepsilon'_{y'y'} - \\ 2\varepsilon'_{x'y'}\varepsilon'_{y'z} \end{pmatrix}\sin(2\theta) \\ 2\varepsilon'_{x'z}\varepsilon'_{y'y'}\cos(2\theta) + \\ \begin{pmatrix} 2\varepsilon'_{y'z}\varepsilon'_{x'z} - \\ \begin{pmatrix} \varepsilon'_{x'x'} + \\ \varepsilon'_{y'y'} \end{pmatrix}\varepsilon'_{y'z} \end{pmatrix}\sin(2\theta) \\ \varepsilon'_{xz}\begin{bmatrix} 2\varepsilon'_{x'y'}\cos(2\theta) + \\ \begin{pmatrix} \varepsilon'_{x'x'} - \\ \varepsilon'_{y'y'} \end{pmatrix}\sin(2\theta) \end{bmatrix} \end{pmatrix} + 2B_{156}\begin{pmatrix} \varepsilon'_{x'z}\begin{bmatrix} 2\varepsilon'_{x'y'}\cos(2\theta) + \\ (\varepsilon'_{x'x'} - \varepsilon'_{y'y'})\sin(2\theta) \end{bmatrix} \\ \varepsilon'_{y'z}\begin{bmatrix} 2\varepsilon'_{x'y'}\cos(2\theta) + \\ (\varepsilon'_{x'x'} - \varepsilon'_{y'y'})\sin(2\theta) \end{bmatrix} \\ 2\varepsilon'_{x'z}\varepsilon'_{y'z}\cos(2\theta) + \\ \begin{bmatrix} (\varepsilon'_{x'z})^2 - \\ (\varepsilon'_{y'z})^2\sin(2\theta) \end{bmatrix} \end{pmatrix} + B_{124}\begin{pmatrix} 2\varepsilon'_{y'z}(\varepsilon'_{y'y'} + \varepsilon'_{zz})\cos(2\theta) + \\ [2\varepsilon'_{x'y'}\varepsilon'_{y'z} + \varepsilon'_{x'z}(\varepsilon'_{x'x'} + \varepsilon'_{y'y'} + 2\varepsilon'_{xx})]\sin(2\theta) \\ 2\varepsilon'_{x'z}(\varepsilon'_{x'x'} + \varepsilon'_{xz})\cos(2\theta) + \\ [2\varepsilon'_{x'y'}\varepsilon'_{x'z} + \varepsilon'_{y'z}(\varepsilon'_{x'x'} + \varepsilon'_{y'y'} + 2\varepsilon'_{zz})]\sin(2\theta) \\ (\varepsilon'_{x'x'} + \varepsilon'_{y'y'})\begin{bmatrix} 2\varepsilon'_{x'y'}\cos(2\theta) + \begin{pmatrix} \varepsilon'_{x'x'} - \\ \varepsilon'_{y'y'} \end{pmatrix}\sin(2\theta) \end{bmatrix} \end{pmatrix}. \quad (29)$$

In Eqn. (28), $e_{14}$ is the linear piezo effect coefficient; and in Eqn. (29), $B_{114}$, $B_{156}$, and $B_{124}$ are quadratic piezo effect coefficients. From the polarizations expressed in Eqns. (28) and (29), we can calculate the polarized charge density $\sigma'_P$ in the (y', z) plane. The 2D Poisson equation may be solved to obtain the electric potential $V'_P$ and the piezoelectric energy change $\delta E_{Piezo}$, as follows $$-\nabla \cdot (P'_{linear} + P'_{quad}) = \sigma'_P$$

$$-\nabla \cdot \varepsilon_0 \varepsilon_r \nabla V'_P = \sigma'_P$$

$$\delta E_{Piezo} = -eV'_P, \quad (30)$$

where $\varepsilon_0$ and $\varepsilon_r$ are the vacuum and semiconductor relative permittivity constants, respectively, and e is the elementary charge.

This model is readily implemented with a FEM with the following steps: (i). Solve the 2D (y', z) coupled partial differential equations with Eqns. (24) and (25) to obtain the displacement vector $u'=(u'_x, u'_y, u'_z)$; (ii). Calculate the strain tensors as a function of y' and z using Eqn. (9); (iii). Obtain the hydrostatic and biaxial strain energy changes $\delta E_{h_y}^C$, $\delta E_{h_y}^v$, and $\delta E_{bi}^v$ by Eqns. (26) and (27), respectively; (iv). Calculate the piezo induced polarizations and charge density in the (y', z) plane by Eqns. (28), (29) and (30); and (v). Use Eqn. (30) to solve the 2D Poisson equation to get the polarization induced potential $V'_p$ and then the piezoelectric energy change $\delta E_{Piezo}$.

Using the model explained above, we systematically investigate the strain induced band profile variations as a function of the rotation angle θ. We scan θ from −90° to 90°. The QWR material is InAs; and the matrix material is GaAs. The material parameters used in the calculations are the same as those in Table 1. To consider the geometric effect of the QWRs, two types of QWRs are considered: one is the isosceles-triangle-based QWR with the cross-sectional triangle base length 10 nm along the y' axis and the triangle height 10 nm along the z axis; the other is the cylindrical QWR with the circle radius of 10 nm in the (y', z) cross-sectional plane.

Referring to FIGS. 12A-12C, the hydrostatic potential at three different orientations is shown. Although hydrostatic energy profile or feature does not display much of a change with the QWR orientation, the magnitude does change with the orientation. Inside the QWR, the energy change is quite uniform. Although not shown, cylindrical QWRs display similar results.

Referring to FIGS. 13A-13F, the biaxial deformation energy profiles at three different orientations is shown. FIGS. 13A-13F shows that, similar to the hydrostatic cases, the biaxial energy profiles are not sensitive to the QWR orientation. Although the energy profile inside the cylindrical QWR is still uniform because of its highly symmetric shape, the biaxial energy deformation inside the triangle-based QWR is non-uniform. The biaxial deformation energy is positive at the triangle top, then decreases to zero in the middle region, and becomes negative at the triangle base.

Referring to FIGS. 14A-14F, the piezoelectric energy variations are shown. Unlike hydrostatic and biaxial effects, the piezoelectric profiles are sensitive to the orientation. The energy profile at θ=45° is the inverted image of that at θ=−45°. At specific orientations, such as θ=0°, the piezoelectric effect disappears independent of the cross-sectional shape. There is no polarization while the QWR is along that direction. Since electromagnetic force is a long range force, the piezoelectric energy change extends far away from the interface between the QWR and the matrix. The energy variation inside the triangle-based QWR varies more than that of its cylindrical counterpart because the charge distribution depends on the geometric shape.

Figure 15A:
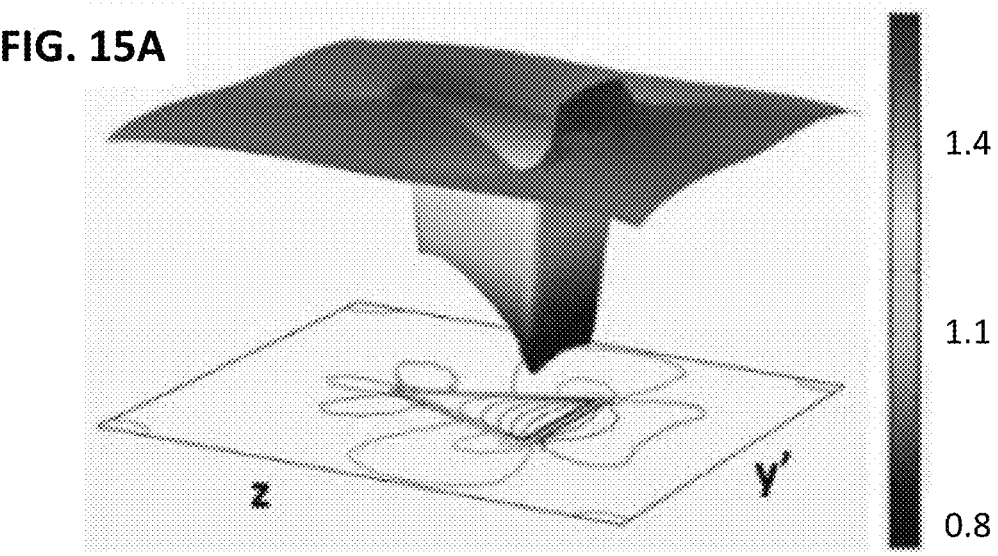
FIGS. 15A-15B are graphical illustrations showing typical conduction-heavy hole band gap profiles (in eV) for the triangle-based QWR (FIG. 15A) and for the cylindrical QWR (FIG. 15B) both at θ=0. The top color gradient corresponds to FIG. 15A and the bottom color gradient corresponds to FIG. 15B.
Figure 15B:
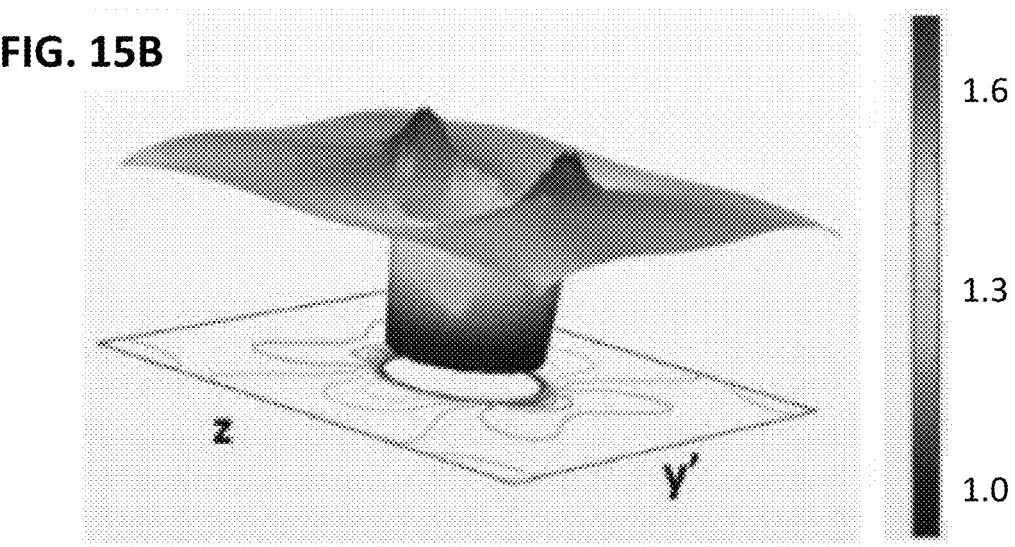

Because of hydrostatic, biaxial, and piezoelectric effects, the band gap of the QWRs will be greatly modified when compared with bulk materials. Referring to FIGS. 15A-15B, the conduction-heavy hole bandgap of the QWRs is shown. FIGS. 15A-15B show that inside the cylindrical QWR, the band gap is uniform and almost independent of the location. The greatest bandgap variations occur around the boundary between the QWR and the matrix. For the triangle-based QWR, the bandgap inside the QWR has a strong position dependence. The geometric center of the triangle has an intermediate bandgap, the maximum and minimum energies are located at the triangle's top and base, respectively. This bandgap profile is similar at all orientations. The piezoelectric energy provides great band profile variations, as shown in FIGS. 15A-15B. This energy change will greatly affect a carrier in each band, but has no effect on the bandgap because the piezoelectric energy change is equal on both conduction and valence bands. Therefore, the bandgap profiles demonstrated in FIGS. 15A-15B are largely a result of the biaxial strain deformation.

Figure 16A:
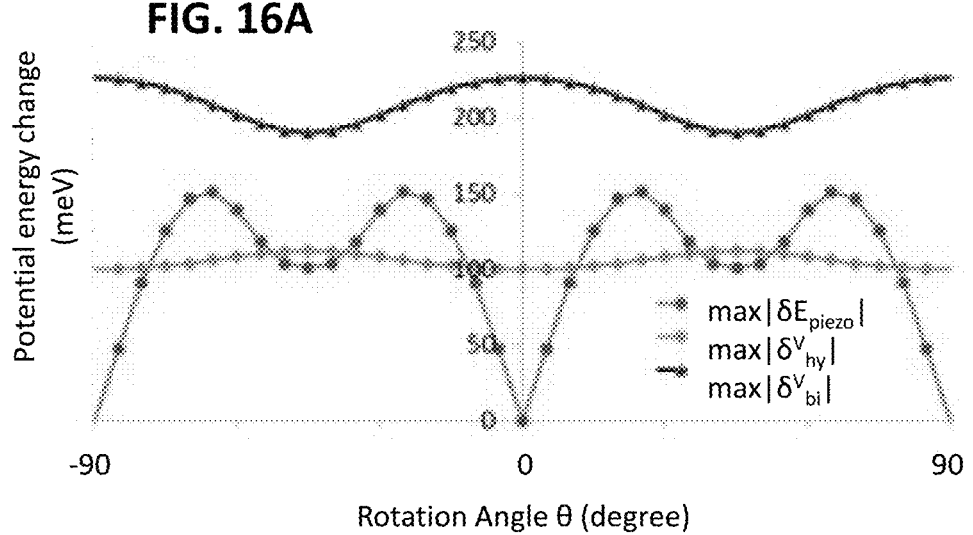
FIGS. 16A-16B are graphs showing maximum hydrostatic, biaxial and piezoelectric energy variations (FIG. 16A); minimum conduction-heavy hole and conduction-light hole bandgaps (FIG. 16B) for the triangle-based QWR with orientations from θ=−90° to θ=90°.
Figure 16B:
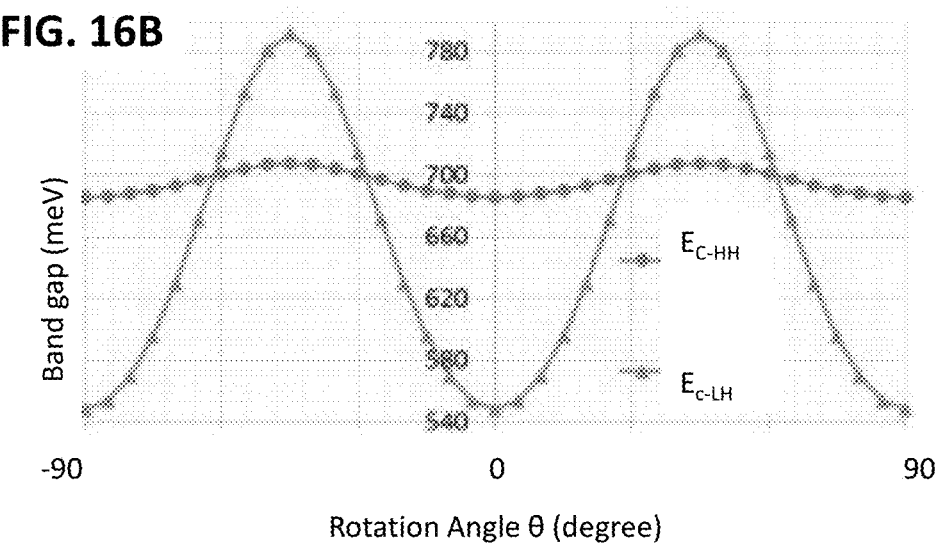
Figure 17A:
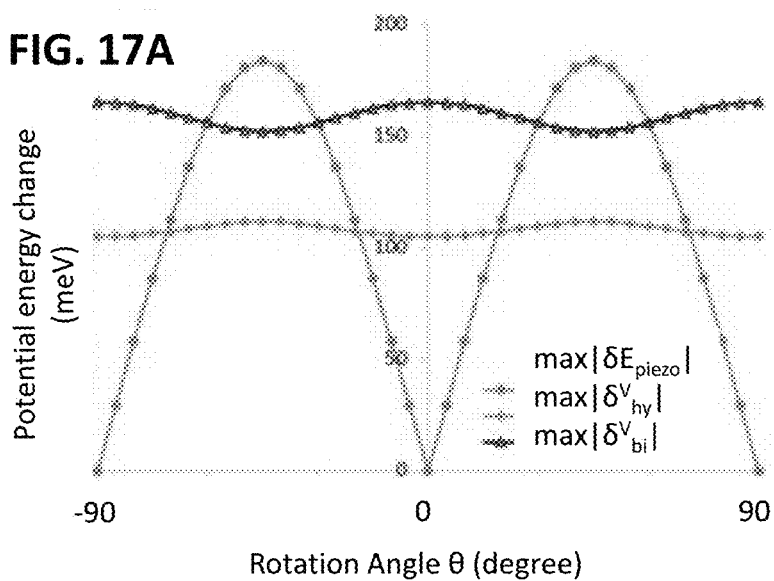
FIGS. 17A-17B are graphs showing (FIG. 17A) maximum hydrostatic, biaxial and piezoelectric energy variations and (FIG. 17B) minimum conduction-heavy hole and conduction-light hole bandgaps for the cylindrical QWR with orientations from θ=−90° to θ=90°.
Figure 17B:
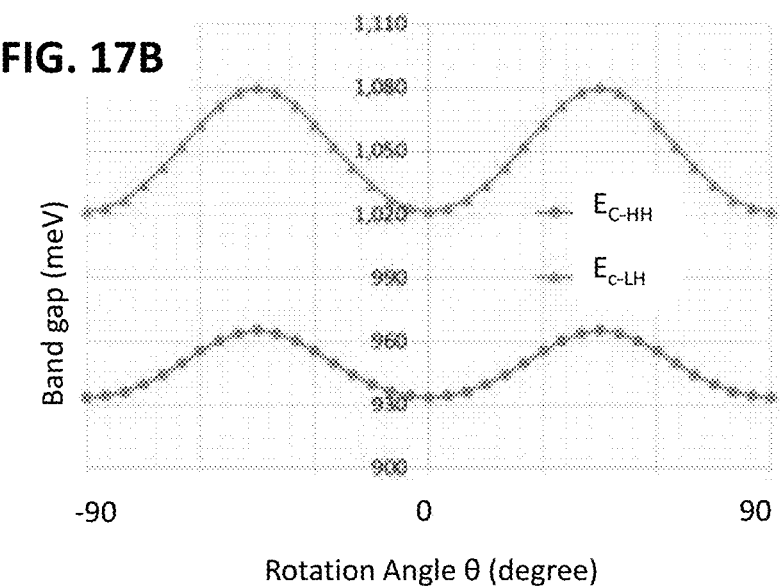

FIGS. 16A-16B show the maximum energy changes at various orientations for the triangle-based QWR. Similarly, FIGS. 17A-17B show the maximum energy changes at various orientations for the cylindrical QWR.

FIGS. 16A-16B and FIGS. 17A-17B show common features for both triangle-based and cylindrical QWRS. The piezoelectric energy varies significantly with the orientations. At some specific orientations, such as θ=0° and θ=+90°, the piezoelectric effect disappears due to zero strain induced polarization along [100] and [010] directions. The biaxial effect, which is responsible for the separation between the heavy-hole and light-hole bands, is stronger than the hydrostatic effect for InAs QWR surrounded by the GaAs matrix. If only the maximum magnitude change of the deformation energies is considered, the result is symmetric for orientations from −θ to θ. The minimum bandgap for both QWRs is in the orientation along [100] or [010] direction and the bandgap reaches the maximum at θ=+45°. The bandgap variation can be as large as 240-250 meV as shown in FIG. 16B for the triangle-based QWR. Finally, for QWRs along [100] and [010] directions, the conduction-heavy hole bandgap is smaller than that of conduction-light hole. The cylindrical QWR keeps this feature at all orientations; however, for the triangle-based QWR as shown in FIG. 16B, because of the geometric and biaxial effects, the heavy-hole and light-hole bandgaps may be degenerate and flip.

The disclosed computational platform may use semiconductor k·p theory to obtain quantum mechanical information. The electronic properties in the crystal may be calculated by a perturbation method with semiconductor conduction and valence bands at Γ point as the basis. The size computational complexity is determined by the interactions included. If only the coupling among heavy-hole and light-hole bands is included, we have a 4-band model. Including of the spin-orbit interaction bands results in a 6-band model. Also including coupling between conduction and valence bands results in an 8-band model. Higher order models may also be evaluated.

The k·p model can reach the expected accuracy for a wide range of applications. Suitably, the 8-band model is very efficient and cost-effective compared with atomistic models and other k·p theory models that utilize a larger band number. Unlike the atomistic models, all input parameters have been extensively studied and well documented for k·p theory methods.

Figure 18A:
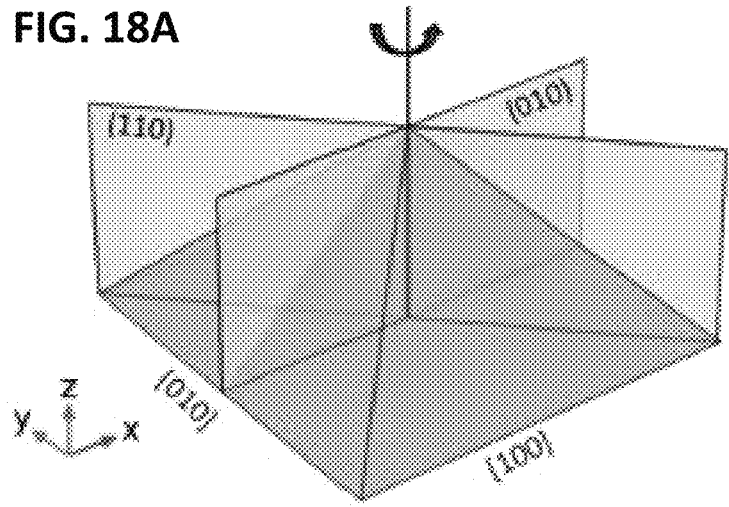
FIGS. 18A-18B are schematic illustrations of (FIG. 18A) a pyramidal QD and (FIG. 18B) a circular-based lens-shaped QD. The geometry symmetric group is $C_{4v}$ for (FIG. 18A) and is $C_{\infty v}$ for (FIG. 18B)
Figure 18B:
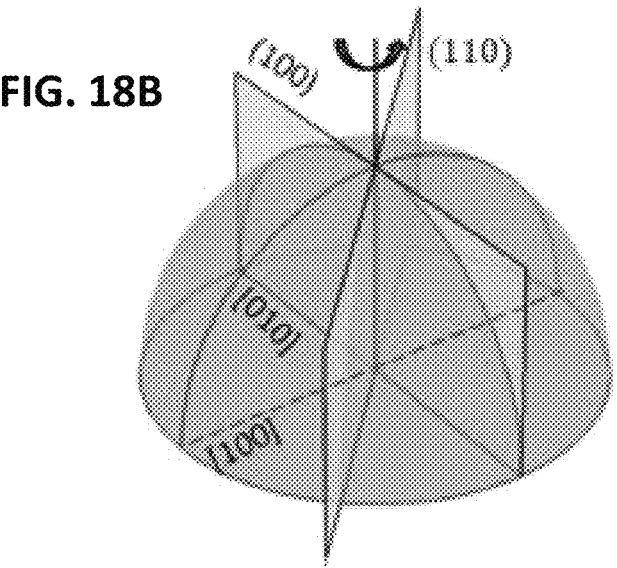

Because of the periodic structure of semiconductor crystals, self-assembled QDs tend to form highly symmetric shapes such as a pyramid or lens. Group theory has been applied to study QD symmetric properties and it is understood that the geometric symmetry of a QD is not identical to the symmetry of the Hamiltonian. For example, in the crystal space, the symmetric group of the pyramidal QD, as shown in FIG. 18A, is the point group $C_{4v}$, and the symmetric group of the lens-shaped QD in FIG. 18B is $C_{\infty v}$. Using zinc-blende crystal symmetric properties and atomistic models, people find the potential energy inside both QDs has $C_{2v}$ symmetry. Therefore, although the geometric symmetries are different for pyramidal and lens-shaped QDs, it is commonly accepted that the symmetric group of the Hamiltonian for both cases is $C_{2v}$.

In k·p theory models, this $C_{2v}$ symmetry is obtained when the piezoelectric potential, resulting from strain-induced polarization, is considered. A point group element acts on the crystal space, which defines the geometric symmetry. This action or operation in the crystal space induces a unitary transformation in the wavefunction space or the Hilbert space, which forms a representation of the point group in the Hilbert space. The symmetric group of the Hamiltonian is the largest group whose elements all commute with the Hamiltonian in the Hilbert space. With the symmetric group of the Hamiltonian identified, one can investigate the electronic and optical properties of QD materials. This includes the ability to obtain the symmetry of wavefunctions and selection rules for optical transitions. Additionally, numerical simulations of QDs are very complicated, sometimes even producing spurious solutions. Group theory predictions can be a benchmark to test the correctness of the numerical simulation results and simplify the computations. For example, evaluating that the symmetric group of the Hamiltonian for the QDs in FIGS. 18A and 18B is $C_{2v}$ allows for the disclosed methods to enforce that the eigenstate of the Hamiltonian has no degeneracy. This enforcement is necessary because all irreducible representations (IRs) of $C_{2v}$ are one-dimensional (1D). Therefore, the ability to correctly identify the symmetry of the quantum mechanical properties and information of a quantum structure improves accuracy and allows for a reduction in computational load.

In a quantum structure, spatial potential and electron spin are strongly coupled. Group elements, such as rotations and reflections, should act on both spatial and spin parts of the wavefunction, not just on the spatial part. Applying the 8-band k·p theory model to zinc-blende type QDs shown in FIGS. 18A and 18B results in determination that the symmetric group is not $C_{2v}$ but the $C_{2v}$ double group denoted as $C_{2v}(D)$. Even if the group elements are forced to act only on the spatial part of the Hilbert space, $C_{2v}$ is not a symmetry group either. The spatial part of the Hilbert space only possesses $C_{2v}$ symmetry when the coupling between spatial potential and spin disappears. As a result, the eigenstate of the Hamiltonian is always two-fold degenerate, corresponding to the two-dimensional (2D) IR of the group. Although our symmetry investigation is based on the 8-band k·p theory, this conclusion is true in general, independent of the specific model.

Turning to the 8×8 Hamiltonian, there are several equivalent forms with different bases. They can be transformed from each other by unitary transformations. For the convenience of our investigation, we start with the following basis $$v=[|s\uparrow\rangle,|X\uparrow\rangle,|Y\uparrow\rangle,|Z\uparrow\rangle,|s\downarrow\rangle,|X\downarrow\rangle,|Y\downarrow\rangle,|Z\downarrow\rangle]^T, \quad (31)$$

where $|s\rangle$ corresponds to the conduction band s orbital state, and $|X\rangle$, $|Y\rangle$, and $|Z\rangle$, describe the valence band p orbital states. The corresponding Hamiltonian is $$\hat{H}_{8\times 8}=\hat{H}_k+V_{so}+V_0+V_{strain}. \quad (32)$$

In Eq. (32), $\widehat{H_k}$ is the kinetic energy part or k operator part of the Hamiltonian.

$$\hat{H}_k = \begin{bmatrix} \hat{H}_4 & 0 \\ 0 & \hat{H}_4 \end{bmatrix} \quad (33)$$

-continued $$\hat{H}_4 = \begin{bmatrix} h_{cc} & H_{cv} \\ \hat{H}_{cv}^\dagger & \hat{H}_{vv} \end{bmatrix}$$

$$h_{cc} = A_c(k_x^2 + k_y^2 + k_z^2)$$

$$\hat{H}_{cv} = [iP_0 k_x, iP_0 k_y, iP_0 k_z]$$

$$\hat{H}_{vv} = \begin{bmatrix} h_{xx} & h_{xy} & h_{xz} \\ & h_{yy} & h_{yz} \\ & & h_{zz} \end{bmatrix} =$$

$$\begin{bmatrix} L'k_x^2 + M(k_y^2 + k_z^2) & N'k_x k_y & N'k_x k_z \\ & L'k_y^2 + M(k_z^2 + k_x^2) & N'k_y k_z \\ & & L'k_z^2 + M(k_x^2 + k_y^2) \end{bmatrix}.$$

In Eq. (33), k is an operator defined as $k_i=k_j=-\partial/\partial j$. For convenience, the notation k instead of $\hat{k}$ will be used. $P_0$ is a material related parameter responsible for the coupling between conduction and valence bands. The other material related parameters are defined as $$A_c = \frac{\hbar^2}{2m_c} - \frac{2P_0^2}{3E_g} - \frac{P_0^2}{3(E_g+\Delta)} \quad (34)$$

$$L' = -\frac{\hbar^2}{2m_0}(\gamma_1+4\gamma_2)$$

$$M = -\frac{\hbar^2}{2m_0}(\gamma_1-2\gamma_2)$$

$$N' = -\frac{\hbar^2}{2m_0}(6\gamma_3).$$

In Eq. (34), $m_0$ is the free electron mass, $m_c$ is electron effective mass in the conduction band, $E_g$ is the bulk semiconductor material band gap, $\Delta$ is the spin-orbit coupling energy, and $\gamma_{1,\,2,\,3}$ are normalized Luttinger parameters.

In Eq. (32), $V_{so}$ is the spin-orbit coupling potential. The associated Hermitian matrix is defined as $$V_{so} = \begin{bmatrix} V_{so4} & \Gamma \\ (\Gamma^T) & V_{so4}^* \end{bmatrix} \quad (35)$$

$$V_{so4} = \begin{bmatrix} 0 & 0 & 0 & 0 \\ & -\Delta/3 & -i\Delta/3 & 0 \\ & & -\Delta/3 & 0 \\ & & & -\Delta/3 \end{bmatrix}$$

$$\Gamma = \begin{bmatrix} 0 & 0 & 0 & 0 \\ 0 & 0 & 0 & \Delta/3 \\ 0 & 0 & 0 & -i\Delta/3 \\ 0 & -\Delta/3 & i\Delta/3 & -\Delta/3 \end{bmatrix}.$$

In Eq. (32), $V_0$ is related to the bulk material band edge potential energy. It is a diagonal matrix defined as $$V_0 = \begin{bmatrix} V_{04} & 0 \\ 0 & V_{04} \end{bmatrix}, V_{04} = \begin{bmatrix} E_c & & & \\ & E_v & & \\ & & E_v & \\ & & & E_v \end{bmatrix}, \quad (36)$$

where Ec and Ev are the bulk material conduction and valence band edge energies, respectively.

In Eq. (32), $V_{strain}$ is the potential energy matrix due to strain deformation and strain-induced piezoelectric effects.

The strain-induced deformation part, $V_{deform}$, is an 8×8 Hermitian matrix that can be obtained from the $\widehat{H_k}$ matrix by making the following replacements $$P_0 \to 0, k_i k_j \to \varepsilon_{ij}, i, j \in (x, y, z) \quad (37)$$

$$A_c \to a_c, \frac{h^2 v_1}{2m_0} \to -a_v, \frac{h^2 v_2}{2m_0} \to -\frac{b}{2}, \frac{h^2 v_3}{2m_0} \to -\frac{d}{2\sqrt{3}},$$

where $a_c$, $a_v$, b, and d are deformation potentials for the conduction and valence bands, and $\varepsilon_{ij}$ is the strain tensor. In addition to the above replacements, the piezoelectric potential effect, which is an 8×8 diagonal matrix, should be added to $V_{strain}$. We then have $$V_{strain} = V_{deform}(\varepsilon_{ij}) + \delta E_{piezo} I, \quad (38)$$

where $\delta E_{piezo}$ is the piezoelectric potential energy due to strain-induced polarization, and I is the 8×8 unity matrix. The strain tensor, $\varepsilon_{ij}$, in Eq. (37) and piezoelectric potential, $\delta E_{piezo}$, in Eq. (38) can be calculated based on the QD material, the surrounding matrix material, and the QD geometric shape.

For the QDs shown in FIGS. 18A and 18B, the kinetic energy, spin-orbit coupling, band edge energies of conduction and valence bands, and strain deformation parts of the Hamiltonian, $\hat{H}_k + V_{SO} + V_0 + V_{Deform}(\varepsilon_{ij})$, commute with the rotation operator $$R_z(\theta) = e^{-i\hat{j}_z \theta/h},$$

for $$\theta = \frac{n\pi}{2},$$

n=1,2,3,4. The piezoelectric potential part of the Hamiltonian, $\delta E_{piezo} I$, only commutates with the rotation operator $\theta = \pi, 2\pi$. This in turn means that the 8×8 Hamiltonian commute with the same operators. Because of the coupling between spatial potential and spin, a full $2\pi$ rotation in the Hilbert space is not the unitary transformation. In other words, these operators do not form a new representation of the $C_{2v}$ group in the Hilbert space. A new element $\hat{N} = \widehat{R_z}$ ($\theta = 2\pi$) has to be introduced into the $C_{2v}$ group to create a new group called the $C_{2v}$ double group, or $C_{2v}(D)$ that has twice the group element of $C_{2v}$.

$V_0$, $V_{deform}(\varepsilon_{ij})$ and $\delta E_{piezo} I$ depend on the geometric shape of the quantum structure. If the quantum structure has lower geometric symmetry or the orientation changes, the Hamiltonians symmetry may be reduced. Therefore, $C_{2v}(D)$ is the maximum symmetric group of the 8×8 Hamiltonian.

When the 8×8 Hamiltonian has $C_{2v}(D)$ symmetry, the eigenstates are two-fold degenerate. Any eigenfunction of the Hamiltonian should be the basis of one of the IRs of C2v(D). As shown in Table 2, $C_{2v}(D)$ has four 1D IRs: $A_1$, $A_2$, $B_1$, and $B_2$; and one 2D IR, $E_{1/2}$. However, the eigenfunctions of the 8×8 Hamiltonian have to be in the 2D IR, $E_{1/2}$. In other words, the eigenstate is two-fold degenerate. If there are accidental degeneracies, the eigenstate of the Hamiltonian can have 2n-fold degeneracy, where n=1, 2, ...

TABLE 2

Character table of groups $C_{2v}$ and $C_{2v}(D)$

| $C_{2v}(D)$ | $C_{2v}$ E | $C_2^1$ | $\sigma_{(1\bar{1}0)}$ | $\sigma_{(1\bar{1}0)}$ | N |
|---|---|---|---|---|---|
| | E | $2C_2^1$ | $2\sigma_{(1\bar{1}0)}$ | $2\sigma_{(1\bar{1}0)}$ | |
| $A_1$ | 1 | 1 | 1 | 1 | 1 |
| $A_2$ | 1 | 1 | −1 | −1 | 1 |
| $B_1$ | 1 | −1 | 1 | −1 | 1 |
| $B_2$ | 1 | −1 | −1 | 1 | 1 |
| $E_{1/2}$ | 2 | 0 | 0 | 0 | −2 |

These transformation invariances can be used as a benchmark to check the correctness of numerical calculations and to reduce the computational load on the computational platform.

In summary, based on a continuum elasticity model, a novel framework relying on a set of coupled partial differential equations (PDEs) was developed, as described. The present approach was used to investigate the changes of InAs/GaAs QD band edge due to strain and piezoelectric effects. Compared with other numerical approaches, such as finite volume or plane wave expansion methods, FEM is more efficient and versatile for various geometric shapes and boundary conditions.

The present invention has been described in terms of one or more preferred embodiments, and it should be appreciated that many equivalents, alternatives, variations, and modifications, aside from those expressly stated, are possible and within the scope of the invention.

We claim:

1. A computer-readable medium embedded with instructions executable by a processor of a computational platform, the instructions comprising steps of:
   receiving, using an input of a computational platform, parameter information corresponding to a quantum structure, the parameter information comprising geometrical parameters and material parameters associated with the quantum structure and a matrix in contact with the quantum structure;
   generating, using a processor of the computational platform, a quantum structure model based on the parameter information received, wherein the quantum structure model comprises at least one mesh;
   determining, using the processor, at least one property of the quantum structure; and
   generating a report indicative of the at least one property determined,
   wherein determining the at least one property of the quantum structure comprises:
   obtaining, using a Strain solver module, the parameter information, and the at least one mesh, a displacement vector $\vec{u}$;
   obtaining, using the Strain solver module, the parameter information, and the displacement vector $\vec{u}$, a strain tensor $\bar{\varepsilon}$; and
   obtaining, using a Piezoelectric solver module, the parameter information, and the strain tensor $\bar{\varepsilon}$, a conduction band hydrostatic strain energy change $\delta E_{hy}^C$, a valence band hydrostatic strain energy change $\delta E_{hy}^v$, a valence band biaxial strain energy change $\delta E_{bi}^v$, a strain induced polarization $\vec{P}$, a strain induced charge density $\sigma_p$, a polarization induced potential $V_P$, a piezoelectric energy change $\delta E_{Piezo}$, a transition energy, or any combination thereof.

2. The medium of claim 1, wherein determining the at least one property of the quantum structure comprises an electrical property, a transport property, an optical property, an elastic property, or any combination thereof.

3. The medium of claim 1, wherein determining the at least one property of the quantum structure comprises obtaining the at least one property of the quantum structure using the at least one mesh and a finite element method.

4. The medium of claim 1, wherein determining the at least one property of the quantum structure further comprises:
obtaining, using a Schrödinger solver module, the parameter information, the strain tensor the piezoelectric energy change $\delta E_{Piezo}$, and a second mesh, a Hamiltonian $\hat{H}$, a strain induced potential $V_{Strain}$, a strain induced deformation potential $V_{Deform}$, a wavefunction, an eigenstate, an eigen-energy, or any combination thereof.

5. The medium of claim 4, wherein the mesh used to obtain the displacement vector $\vec{u}$ and the second mesh are the same mesh.

6. The medium of claim 1, wherein the quantum structure is a quantum dot or a quantum wire.

7. A computational platform for a quantum structure, the computational platform comprising:
an input module configured to receive parameter information corresponding to a quantum structure, the parameter information comprising geometrical parameters and material parameters associated with the quantum structure and a matrix in contact with the quantum structure;
a processor programmed to carry out instructions stored in a computer-readable medium, the instructions comprising:
receiving, using the input module, the parameter information corresponding to the quantum structure;
generating a quantum structure model based on the parameter information received,
wherein the quantum structure model comprises at least one mesh;
determining at least one property of the quantum structure; and
generating a report indicative of the at least one property determined; and
an output module for providing the report,
wherein determining the at least one property of the quantum structure comprises:
obtaining, using a Strain solver module, the parameter information, and the at least one mesh, a displacement vector $\vec{u}$;
obtaining, using the Strain solver module, the parameter information, and the displacement vector $\vec{u}$, a strain tensor $\bar{\varepsilon}$; and
obtaining, using a Piezoelectric solver module, the parameter information, and the strain tensor $\bar{\varepsilon}$, a conduction band hydrostatic strain energy change $\delta E_{hy}^{C}$, a valence band hydrostatic strain energy change $\delta E_{hy}^{v}$, a valence band biaxial strain energy change $\delta E_{bi}^{v}$, a strain induced polarization $\vec{P}$, a strain induced charge density $\sigma_P$, a polarization induced potential $V_P$, a piezoelectric energy change $\delta E_{Piezo}$, a transition energy, or any combination thereof.

8. The computational platform of claim 7, wherein the processor is further configured to generate design information or control signals based on the at least one property of the quantum structure, and provide the information or control signals to an assembly line using the output module.

9. The computational platform of claim 8, wherein determining the at least one property of the quantum structure comprises an electrical property, a transport property, an optical property, an elastic property, or any combination thereof.

10. The computational platform of claim 7, wherein determining the at least one property of the quantum structure comprises obtaining the at least one property of the quantum structure using the at least one mesh and a finite element method.

11. The computational platform of claim 7, wherein determining the at least one property of the quantum structure further comprises:
obtaining, using a Schrödinger solver module, the parameter information, the strain tensor $\bar{\varepsilon}$, the piezoelectric energy changed $\delta E_{Piezo}$, and a second mesh, a Hamiltonian $\hat{H}$, a strain induced potential $V_{Strain}$, a strain induced deformation potential $V_{Deform}$, a wavefunction, an eigenstate, an eigen-energy, or any combination thereof.

12. The computational platform of claim 11, wherein the determining the at least one property of the quantum structure further comprises evaluating the symmetry of the Hamiltonian $\hat{H}$, the strain induced potential $V_{Strain}$, the strain induced deformation potential $V_{Deform}$, the wavefunction, the eigenstate, the eigen-energy, or any combination thereof.

13. The computational platform of claim 11, wherein the mesh used to obtain the displacement vector $\vec{u}$ and the second mesh are the same mesh.

14. The computational platform of claim 7, wherein the quantum structure is a quantum dot or a quantum wire.

15. A method for the fabrication of a quantum structure, the method comprising:
(a) receiving, using an input of a computational platform, parameter information corresponding to a quantum structure, the parameter information comprising geometrical parameters and material parameters associated with the quantum structure and a matrix in contact with the quantum structure;
(b) generating, using a Strain solver module, at least one mesh based on the parameter information received;
(c) obtaining, using the Strain solver module, the parameter information, and the at least one mesh, a displacement vector $\vec{u}$;
(d) obtaining, using the Strain solver module, the parameter information, and the displacement vector $\vec{u}$, a strain tensor $\bar{\varepsilon}$;
(e) obtaining, using a piezo-electric solver module, the parameter information, and the strain tensor $\bar{\varepsilon}$, a piezoelectric energy change $\delta E_{Piezo}$ and, optionally obtaining, a conduction band hydrostatic strain energy change $\delta E_{hy}^{C}$, a valence band hydrostatic strain energy change $\delta E_{hy}^{v}$, a valence band biaxial strain energy change $\delta E_{bi}^{v}$, a strain induced polarization $\vec{P}$, a strain induced charge density $\sigma_P$, a polarization induced potential $V_P$, a transition energy, or any combination thereof;
(f) obtaining, using a Schrödinger solver module, the parameter information, the strain tensor $\bar{\varepsilon}$, the piezoelectric energy change $\delta E_{piezo}$, and a second mesh, a Hamiltonian $\hat{H}$, a strain induced potential $V_{Strain}$, a strain induced deformation potential $V_{Deform}$, a wavefunction, an eigenstate, an eigen-energy, or any combination thereof;

(g) evaluating the symmetry of the Hamiltonian $\hat{H}$, the strain induced potential $V_{Strain}$, the strain induced deformation potential $V_{Deform}$, the wavefunction, the eigenstate, the eigen-energy, or any combination thereof;

(h) generating design information or control signals based on at least one property of the quantum structure; and (i) providing the information or control signals to an assembly line using an output module.

16. The method of claim 15, wherein the Hamiltonian $\hat{H}$, the strain induced potential $V_{Strain}$, the strain induced deformation potential $V_{Deform}$, the wavefunction, the eigenstate, the eigen-energy, or any combination thereof is evaluated for $C_{2v}$ double group symmetry.

\* \* \* \* \*

UNITED STATES PATENT AND TRADEMARK OFFICE
CERTIFICATE OF CORRECTION

PATENT NO. : 11,636,371 B2
APPLICATION NO. : 16/660472
DATED : April 25, 2023
INVENTOR(S) : Wei Li et al.

It is certified that error appears in the above-identified patent and that said Letters Patent is hereby corrected as shown below:

In the Claims

Column 25, Claim 4, Line 13, "tensor the" should be --tensor $\bar{\bar{\varepsilon}}$, the--.

Column 26, Claim 11, Line 18, "changed" should be --change--.

Column 26, Claim 15, Line 63, "$\delta E_{piezo}$" should be --$\delta E_{Piezo}$--.

Signed and Sealed this
Fifteenth Day of August, 2023

*Katherine Kelly Vidal*
Katherine Kelly Vidal
*Director of the United States Patent and Trademark Office*